(12) United States Patent
Betzig

(10) Patent No.: US 9,891,421 B2
(45) Date of Patent: *Feb. 13, 2018

(54) BESSEL BEAM PLANE ILLUMINATION MICROSCOPE

(71) Applicant: Howard Hughes Medical Institute, Ashburn, VA (US)

(72) Inventor: Robert E. Betzig, Leesburg, VA (US)

(73) Assignee: Howard Hughes Medical Institute, Ashburn, VA (US)

( * ) Notice: Subject to any disclaimer, the term of this patent is extended or adjusted under 35 U.S.C. 154(b) by 378 days.

This patent is subject to a terminal disclaimer.

(21) Appl. No.: 14/215,976

(22) Filed: Mar. 17, 2014

(65) Prior Publication Data

US 2014/0198200 A1    Jul. 17, 2014

Related U.S. Application Data

(62) Division of application No. 13/160,492, filed on Jun. 14, 2011, now Pat. No. 8,711,211.

(60) Provisional application No. 61/354,532, filed on Jun. 14, 2010, provisional application No. 61/386,342, (Continued)

(51) Int. Cl.
| | |
|---|---|
| *H04N 9/47* | (2006.01) |
| *G03H 1/00* | (2006.01) |
| *G02F 1/01* | (2006.01) |
| *G02B 21/06* | (2006.01) |
| *G02B 21/36* | (2006.01) |

(Continued)

(52) U.S. Cl.
CPC .......... *G02B 21/36* (2013.01); *G02B 21/002* (2013.01); *G02B 21/0004* (2013.01); *G02B 21/0096* (2013.01); *G02B 21/06* (2013.01); *G02B 21/361* (2013.01); *G02B 21/365* (2013.01); *G02B 27/095* (2013.01)

(58) Field of Classification Search
CPC ... H04N 9/47; G03H 1/00; G02F 1/01; G02B 21/06
USPC .............. 359/30, 240, 385, 388; 348/79, 61
See application file for complete search history.

(56) References Cited

U.S. PATENT DOCUMENTS

| | | |
|---|---|---|
| 4,833,633 A | 5/1989 | Morris et al. |
| 5,245,619 A | 9/1993 | Kronberg et al. |
| 5,856,049 A | 1/1999 | Lee |

(Continued)

OTHER PUBLICATIONS

Notice of Allowance for U.S. Appl. No. 13/160,492, dated Dec. 18, 2013, 10 pages (Continued)

*Primary Examiner* — Daquan Zhao
(74) *Attorney, Agent, or Firm* — Brake Hughes Bellermann LLP

(57) ABSTRACT

A microscope has a light source for generating a light beam having a wavelength, $\lambda$, and beam-forming optics configured for receiving the light beam and generating a Bessel-like beam that is directed into a sample. The beam-forming optics include an excitation objective having an axis oriented in a first direction. Imaging optics are configured for receiving light from a position within the sample that is illuminated by the Bessel-like beam and for imaging the received light on a detector. The imaging optics include a detection objective having an axis oriented in a second direction that is non-parallel to the first direction. A detector is configured for detecting signal light received by the imaging optics, and an aperture mask is positioned.

38 Claims, 17 Drawing Sheets

Related U.S. Application Data filed on Sep. 24, 2010, provisional application No. 61/433,034, filed on Jan. 14, 2011.

(51) Int. Cl.
  *G02B 21/00* (2006.01)
  *G02B 27/09* (2006.01)

(56) References Cited

U.S. PATENT DOCUMENTS

| | | | |
|---|---|---|---|
| 6,480,524 | B1 | 11/2002 | Smith et al. |
| 6,909,105 | B1 | 6/2005 | Heintzmann et al. |
| 7,626,695 | B2 | 12/2009 | Betzig et al. |
| 7,626,703 | B2 | 12/2009 | Betzig et al. |
| 7,710,563 | B2 | 5/2010 | Betzig et al. |
| 7,782,457 | B2 | 8/2010 | Betzig et al. |
| 8,413,080 | B1* | 4/2013 | Somerstein ......... G03F 7/70091 716/51 |
| 8,599,376 | B2 | 12/2013 | Betzig et al. |
| 8,711,211 | B2 | 4/2014 | Betzig |
| 9,223,125 | B2 | 12/2015 | Betzig |
| 9,448,395 | B2 | 9/2016 | Betzig |
| 9,477,074 | B2 | 10/2016 | Betzig |
| 2004/0027889 | A1 | 2/2004 | Occhipinti et al. |
| 2004/0264897 | A1 | 12/2004 | Lin et al. |
| 2005/0036136 | A1 | 2/2005 | Opsal et al. |
| 2005/0136510 | A1 | 6/2005 | Hendriks et al. |
| 2005/0141082 | A1 | 6/2005 | Yoshida et al. |
| 2005/0258375 | A1 | 11/2005 | Mertz et al. |
| 2006/0016989 | A1 | 1/2006 | Nakasuji et al. |
| 2006/0257089 | A1 | 11/2006 | Mueth et al. |
| 2007/0251543 | A1* | 11/2007 | Singh ............... G03F 7/70925 134/1 |
| 2007/0291353 | A1 | 12/2007 | Iketaki et al. |
| 2008/0057413 | A1 | 3/2008 | Shim |
| 2008/0068588 | A1 | 3/2008 | Hess et al. |
| 2008/0123713 | A1 | 5/2008 | Kamiyama et al. |
| 2008/0240718 | A1 | 10/2008 | Werner et al. |
| 2008/0279558 | A1* | 11/2008 | Capron ............... H04B 10/112 398/118 |
| 2008/0304397 | A1 | 12/2008 | Lee et al. |
| 2009/0027747 | A1 | 1/2009 | Lee et al. |
| 2009/0231689 | A1* | 9/2009 | Pittsyn .................. G01B 9/04 359/363 |
| 2010/0084384 | A1 | 4/2010 | Bovatsek et al. |
| 2010/0103962 | A1 | 4/2010 | Ando et al. |
| 2010/0265575 | A1 | 10/2010 | Lippert et al. |
| 2011/0122488 | A1* | 5/2011 | Truong ............. G01N 21/6408 359/385 |
| 2011/0134521 | A1 | 6/2011 | Truong et al. |
| 2011/0140009 | A1* | 6/2011 | Kaertner ................ H05G 2/00 250/504 R |
| 2011/0205339 | A1 | 8/2011 | Pavani et al. |
| 2011/0205352 | A1 | 8/2011 | Pavani et al. |
| 2011/0304723 | A1 | 12/2011 | Betzig |
| 2013/0126759 | A1 | 5/2013 | Betzig et al. |
| 2013/0286181 | A1 | 10/2013 | Betzig et al. |
| 2014/0198201 | A1 | 7/2014 | Betzig |
| 2014/0284461 | A1 | 9/2014 | Betzig |
| 2014/0285651 | A1 | 9/2014 | Betzig |
| 2014/0285653 | A1 | 9/2014 | Betzig |

OTHER PUBLICATIONS

Restriction Requirement for U.S. Appl. No. 13/160,492, dated Aug. 22, 2013, 6 pages.
Response to Restriction Requirement for U.S. Appl. No. 13/160,492, filed Oct. 15, 2013, 20 pages.
Non-Final Office Action for U.S. Appl. No. 13/844,405, dated Apr. 8, 2015, 67 pages.
Non-Final Office Action for U.S. Appl. No. 14/215,912, dated Apr. 10, 2015, 15 pages.
Non-Final Office Action for U.S. Appl. No. 14/216,039, dated Apr. 17, 2015, 14 pages.
Botcherby et al., "Scanning Two Photon Fluorescence Microscopy with Extended Depth of Field", ScienceDirect, Optics Communications 268, 2006, pp. 253-260.
Huisken et al., "Selective Plane Illumination Microscopy Techniques in Developmental Biology", Development 136, 2009, pp. 1963-1975.
So, Peter TC, "Two-photon Fluorescence Light Microscopy", Encyclopedia of Life Sciences, 2002, pp. 1-5.
Notice of Allowance for U.S. Appl. No. 14/215,955, dated May 1, 2015, 10 pages.
Notice of Allowance for U.S. Appl. No. 14/215,955, dated Aug. 18, 2015, 11 pages.

* cited by examiner

BESSEL BEAM PLANE ILLUMINATION MICROSCOPE

CROSS-REFERENCE TO RELATED APPLICATIONS

This application is a Divisional of, and claims priority to, U.S. patent application Ser. No. 13/160,492, filed Jun. 14, 2011, entitled "BESSEL BEAM PLANE ILLUMINATION MICROSCOPE", which, in turn, claims priority of U.S. Provisional Patent Application Nos. 61/354,532, filed Jun. 14, 2010, entitled "BESSEL BEAM PLANE ILLUMINATION MICROSCOPE"; 61/386,342, filed Sep. 24, 2010, entitled "BESSEL BEAM PLANE ILLUMINATION MICROSCOPE"; and 61/433,034, filed Jan. 14, 2011, entitled "BESSEL BEAM PLANE ILLUMINATION MICROSCOPE." The subject matter of each of these earlier filed applications is hereby incorporated by reference.

TECHNICAL FIELD

This disclosure relates to microscopy and, in particular, to Bessel beam plane illumination microscopy.

BACKGROUND

Several imaging technologies are commonly used to interrogate biological systems. Widefield imaging floods the specimen with light, and collects light from the entire specimen simultaneously, although high resolution information is only obtained from that portion of the sample close to the focal plane of the imaging objective lens. Confocal microscopy uses the objective lens to focus light within the specimen, and a pinhole in a corresponding image plane to pass to the detector only that light collected in the vicinity of the focus. The resulting images exhibit less out-of-focus background information on thick samples than is the case in widefield microscopy, but at the cost of slower speed, due to the requirement to scan the focus across the entire plane of interest.

For biological imaging, a powerful imaging modalities is fluorescence, since specific sub-cellular features of interest can be singled out for study by attaching fluorescent labels to one or more of their constituent proteins. Both widefield and confocal microscopy can take advantage of fluorescence contrast. One limitation of fluorescence imaging, however, is that fluorescent molecules can be optically excited for only a limited period of time before they are permanently extinguished (i.e., "photobleach"). Not only does such bleaching limit the amount of information that can be extracted from the specimen, it can also contribute to photo-induced changes in specimen behavior, phototoxicity, or even cell death.

Unfortunately, both widefield and confocal microscopy excite fluorescence in every plane of the specimen, whereas the information rich, high resolution content comes only from the vicinity of the focal plane. Thus, both widefield and confocal microscopy are very wasteful of the overall fluorescence budget and potentially quite damaging to live specimens. A third approach, two photon fluorescence excitation (TPFE) microscopy, uses a nonlinear excitation process, proportional to the square of the incident light intensity, to restrict excitation to regions near the focus of the imaging objective. However, like confocal microscopy, TPFE requires scanning this focus to generate a complete image. Furthermore, the high intensities required for TPFE can give rise to other, nonlinear mechanisms of photodamage in addition to those present in the linear methods of widefield and confocal microscopy.

Thus, there is a need for the ability to: a) confine excitation predominantly to the focal plane of imaging optics, to reduce photodamage and photobleaching, as well as to reduce out-of-focus background; b) use widefield detection, to obtain images rapidly; and c) can be used with linear fluorescence excitation, to avoid nonlinear photodamage.

FIG. 1 is a schematic diagram of a light sheet microscopy (LSM) system 100. As shown in FIG. 1, LSM uses a beam-forming lens 102, external to imaging optics, which include an objective 104, to illuminate the portion of a specimen in the vicinity of the focal plane 106 of the objective. In one implementation, the lens 102 that provides illumination or excitation light to the sample is a cylindrical lens that focuses light in only one direction, thereby providing a beam of light 108 that creates a sheet of light coincident with the objective focal plane 106. A detector 110 then records the signal generated across the entire illuminated plane of the specimen. Because the entire plane is illuminated at once, images can be obtained very rapidly.

In another implementation, termed Digital Laser Scanned Light Sheet Microscopy (DSLM), the lens 102 can be a circularly symmetric multi-element excitation lens (e.g., having a low numerical aperture (NA) objective) that corrects for optical aberrations (e.g., chromatic and spherical aberrations) that are prevalent in cylindrical lenses. The illumination beam 108 of light then is focused in two directions to form a pencil of light coincident with the focal plane 106 of the imaging objective 104. The width of the pencil beam is proportional to the 1/NA, whereas its length is proportional to $1/(NA)^2$. Thus, by using the illumination lens 102 at sufficiently low NA (i.e., NA<<1), the pencil beam 108 of the excitation light can be made sufficiently long to encompass the entire length of the desired field of view (FOV). To cover the other direction defining the lateral width of the FOV, the pencil beam can be scanned across the focal plane (e.g., with a galvanometer, as in confocal microscopy) while the imaging detector 110 integrates the signal that is collected by the detection optics 112 as the beam sweeps out the entire FOV.

A principal limitation of these implementations is that, due to the diffraction of light, there is a tradeoff between the XY extent of the illumination across the focal plane of the imaging objective, and the thickness of the illumination in the Z direction perpendicular to this plane. In the coordinate system used in FIG. 1, the X direction is into the page, the Y direction is in the direction of the illumination beam, and the Z direction is in the direction in which imaged light is received from the specimen.

FIG. 2 is a schematic diagram of a profile 200 of a focused beam of light. As shown in FIG. 2, illumination light 202 of wavelength, λ, that is focused to a minimum beam waist, $2w_o$, within the specimen will diverge on either side of the focus, increasing in width by a factor of $\sqrt{2}$ in a distance of $z_R = \pi w_o^2/\lambda$, the so-called Rayleigh range. Table 1 shows specific values of the relationship between the usable FOV, as defined by $2z_R$, and the minimum thickness $2w_o$ of the illumination sheet, whether created by a cylindrical lens, or by scanning a pencil beam created by a low NA objective.

TABLE 1

| 2w$_o$ (μm, for λ = 500 nm) | 2z$_R$ (μm, for λ = 500 nm) |
|---|---|
| 0.2 | 0.06 |
| 0.4 | 0.25 |
| 0.6 | 0.57 |
| 0.8 | 1.00 |
| 1.0 | 1.57 |
| 2.0 | 6.28 |
| 5.0 | 39.3 |
| 10.0 | 157 |
| 20.0 | 628 |

From Table 1 it can be seen that, to cover FOVs larger than a few microns (as would be required image even small single cells in their entirety) the sheet thickness must be greater than the depth of focus of the imaging objective (typically, <1 micron). As a result, out-of-plane photobleaching and photodamage still remain (although less than in widefield or confocal microscopy, provided that the sheet thickness is less than the specimen thickness). Furthermore, the background from illumination outside the focal plane reduces contrast and introduces noise which can hinder the detection of small, weakly emitting objects. Finally, with only a single image, the Z positions of objects within the image cannot be determined to an accuracy better than the sheet thickness.

SUMMARY

In one general aspect, a microscope can include a light source for generating a light beam having a wavelength, λ, and beam-forming optics configured for receiving the light beam and generating a Bessel-like beam that is directed into a sample. The beam-forming optics can include an excitation objective having an axis oriented in a first direction. The microscope can include imaging optics configured for receiving light from a position within the sample that is illuminated by the Bessel-like beam and for imaging the received light on a detector. The imaging optics can include a detection objective having an axis oriented in a second direction that is non-parallel to the first direction. The microscope can also include a detector configured for detecting signal light received by the imaging optics, and an aperture mask positioned between the sample and the detector configured to prevent light illuminated by side lobes of the Bessel beam from reaching the detector, while allowing light illuminated by a central lobe of the Bessel beam to reach the detector.

Implementations can include one or more of the following features. For example, the microscope can also include beam scanning optics that can be configured for scanning the Bessel-like beam in a direction having a component perpendicular to the first direction. The microscope can also include image-positioning optics positioned in an optical path between the sample and the detector, and configured for imaging signal light from different positions with the sample while the Bessel-like beam is scanned by the beam scanning optics through a fixed position of the aperture mask. The aperture mask can define a slit. The detector can be a line detector.

The Bessel-like beam can have a ratio of a Rayleigh length, z$_R$ to a minimum beam waist, w$_o$, of more than $2\pi w_o/\lambda$ and less than $100\pi w_o/\lambda$. The Bessel-like beam can have a non-zero ratio of a minimum numerical aperture to a maximum numerical aperture of less than 0.95. The Bessel-like beam can have a non-zero ratio of a minimum numerical aperture to a maximum numerical aperture of less than 0.90.

The Bessel-like beam can have a minimum numerical aperture greater than zero and a ratio of energy in a first side of the beam to energy in the central lobe of the beam of less than 0.5.

The microscope can also include a coverslip that supports the sample where a normal direction to a plane of the sample supports the sample forms and angle with the first direction of more than 10 degrees and less than 80 degrees. The sample can be less than ten micrometers thick. The signal light can have a wavelength of λ/2. The signal light can be generated through a non-linear signal generation process. The signal light can include fluorescence light emitted from the sample after excitation by the Bessel-like beam. The signal light can be generated through a non-linear signal generation process. The microscope can also include an annular mask in a path of the light beam configured to generate an annular ring of light from which the Bessel-like beam is formed.

In another general aspect, a microscope can include a light source for generating a light beam having a wavelength, λ, and beam-forming optics configured for receiving the light beam and generating a Bessel-like beam that is directed into a sample. The beam-forming optics can include an excitation objective having an axis oriented in a first direction. The microscope can include imaging optics configured for receiving light from a position within the sample that is illuminated by the Bessel-like beam and for imaging the received light on a detector. The imaging optics can include a detection objective having an axis oriented in a second direction that is non-parallel to the first direction. The microscope can also include a detector configured for detecting light received by the imaging optics where the detector includes a plurality of individual detection units. The microscope can also include a controller operably coupled to the detector and configured to selectively record image data from individual detection units that image portions of the sample that are illuminated by a central lobe of the Bessel-like beam while not recording data from individual detection units that image portions of the sample that are not illuminated by the central lobe of the Bessel-like beam, and can also include a processor configured to generate an image of the sample based on the selectively recorded image data that is recorded from different positions of the Bessel beam within the sample.

Implementations can include one or more of the following features. For example, the microscope can also include beam scanning optics configured for scanning the Bessel-like beam within the sample in a direction having a component perpendicular to the first direction. The beam scanning optics can be configured to scan the Bessel-like beam in the sample in steps that are greater than or approximately equal to a corresponding spacing between neighboring individual detector elements in the detector. The microscope can also include a beam blocking unit configured to block the Bessel-like beam from reaching the sample when the Bessel-like beam is scanned form one step position to a next step position.

The microscope can also include a diffractive optical element (DOE) configured to generate a plurality of light beams from the light beam generated by the light source. The beam-forming optics can be configured for receiving the plurality of light beams and generating a plurality of Bessel-like beams that in the sample. The plurality of light beams can be spaced from each other by a spatial period that is greater than the diameter of a side lobe of the Bessel-like beams. The imaging optics can be further configured for simultaneously receiving light from positions within the sample that are illuminated by the plurality of Bessel-like beams and for imaging the received light on the detector. The controller can be further configured to selectively record image data simultaneously from individual detection units that image portions of the sample that are illuminated by a central lobe of the Bessel-like beams while not recording data from individual detection units that image portions of the sample that are not illuminated by the central lobes of the Bessel-like beams.

The processor can be configured to generate an image of the sample based on the selectively recorded image data that is recorded from different positions of the Bessel beam within the sample, after the plurality of Bessel-like beams are scanned over the spatial period. The Bessel-like beam can have a ratio of a Rayleigh length, $z_R$ to a minimum beam waist, $w_o$, of more than $2\pi w_o/\lambda$ and less than $100\pi w_o/\lambda$. The Bessel-like beam can have a non-zero ratio of a minimum numerical aperture to a maximum numerical aperture of less than 0.95. The Bessel-like beam can have a non-zero ratio of a minimum numerical aperture to a maximum numerical aperture of less than 0.90. The Bessel-like beam can have a minimum numerical aperture greater than zero and a ratio of energy in a first side of the beam to energy in the central lobe of the beam of less than 0.5.

The microscope can also include a coverslip that supports the sample where a normal direction to a plane of the sample that supports the sample forms and angle with the first direction of more than 10 degrees and less than 80 degrees. The sample can be less than ten micrometers thick. The microscope can also include an annular mask in a path of the light beam configured to generate an annular ring of light from which the Bessel-like beam is formed.

In yet another general aspect, a microscope can include a light source for generating a light beam having a wavelength, $\lambda$, and beam-forming optics, including an optical element positioned in a path of the light beam and configured for generating an annular ring of light. The beam-forming optics being configured for generating from the light beam an excitation beam having a central lobe and at least one side lobe and also configured to direct the excitation beam to a position within a sample. The beam-forming optics can include an excitation objective having an axis oriented in a first direction, and a transverse profile of the excitation beam in the sample can be intermediate between a profile of a lowest order Bessel function and the Gaussian function. The microscope can also include imaging optics configured for receiving light from a position within the sample that is illuminated by the excitation beam and for imaging the received light on a detector. The imaging optics can include a detection objective having an axis oriented in a second direction that is non-parallel to the first direction. The microscope can also include a detector configured for detecting light received by the imaging optics.

Implementations can include one or more of the following features. For example, the optical element can be positioned in a path of the light beam and can be configured for generating an annular ring of light includes an annular apodization mask. The optical element can be positioned in a path of the light beam and can be configured for generating an annular ring of light includes a binary phase mask. The optical element can be positioned in a path of the light beam and can be configured for generating an annular ring of light includes a programmable spatial light modulator. The excitation beam can have a non-zero minimum numerical aperture and a maximum numerical aperture, and a ratio between the minimum numerical aperture and the maximum numerical aperture can be less than about 0.95. The excitation beam can have a non-zero minimum numerical aperture and a maximum numerical aperture, and a ratio between the minimum numerical aperture and the maximum numerical aperture can be less than about 0.90. An amount of energy in a highest-energy side lobe of the excitation beam can be less than about half of an amount of energy in the central lobe of the excitation beam.

A ratio of a Rayleigh length, $z_R$, of the excitation beam in the sample to a minimum beam waist, $w_o$, of the excitation beam in the sample is more than about $2\pi w_o/\lambda$ and less than about $100\pi w_o/\lambda$. The microscope can also include a cover slip having a planar surface upon which the sample is mounted or cultured. The planar surface can be tilted at an angle between 10 and 80 degrees with respect to the first direction. The sample can be less than ten micrometers thick. The microscope can also include beam scanning optics configured for scanning the excitation beam in a direction having a component perpendicular to the first direction. The signal light can have a wavelength of $\lambda/2$.

In yet another general aspect, a microscope can include a light source for generating a light beam having a wavelength, $\lambda$, and beam-forming optics configured for receiving the light beam and generating a Bessel-like beam that is directed into a sample. The beam-forming optics can include an excitation objective having an axis oriented in a first direction. The microscope can include imaging optics configured for receiving signal light from a position within the sample that is illuminated by the Bessel-like beam and for imaging the received light on a detector. The imaging optics can include a detection objective having an axis oriented in a second direction that is non-parallel to the first direction. The microscope can include beam-translation optics configured for translating the position of the Bessel-like beam within the sample in discrete steps of more than or about $\lambda/2NA$ to create a first excitation pattern of multiple Bessel-like beams having a spatial period, $\Lambda$, equal to the distance between beam positions of neighboring steps and configured to create N−1 additional excitation patterns that are spatially phase shifted from the first excitation pattern by $(N-1)\Lambda/N$. The microscope can also include a detector configured for detecting signal light received by the imaging optics where the detector has individual detection units, and can also include a processor configured to generate N images from the received signal light where each n image, for n=1 to N, is based on detected light due to excitation of the sample by the $n^{th}$ excitation pattern and configured generate a final image of the sample by combining the individual images according to $$I_{final} = \left| \sum_{n=1}^{N} I_n \exp(2\pi i n/N) \right|.$$

Implementations can include one or more of the following features. For example, the signal light can have a wavelength of $\lambda/2$. The signal light can be generated through a non-linear signal generation process. In some implementations, N=3. The step size can be less than or about $\lambda/NA$. In some implementations, N≥5. The step size can be greater than or about $\lambda/NA$. The Bessel-like beam can have a ratio of a Rayleigh length, $z_R$ to a minimum beam waist, $w_o$, of more than $2\pi w_o/\lambda$ and less than $100\pi w_o/\lambda$. The Bessel-like beam can have a non-zero ratio of a minimum numerical aperture to a maximum numerical aperture of less than 0.95. The Bessel-like beam can have a non-zero ratio of a minimum numerical aperture to a maximum numerical aperture of less than 0.90. The Bessel-like beam can have a minimum numerical aperture greater than zero and a ratio of energy in a first side of the beam to energy in the central lobe of the beam of less than 0.5.

The microscope an also include a coverslip that supports the sample where a normal direction to a plane of the sample that supports the sample forms and angle with the first direction of more than 10 degrees and less than 80 degrees. The sample can be less than ten micrometers thick. The microscope an also include an annular mask in a path of the light beam configured to generate an annular ring of light from which the Bessel-like beam is formed.

In yet another general aspect, a microscope can include a light source for generating a light beam having a wavelength, $\lambda$, and beam-forming optics, including an optical element positioned in a path of the light beam and configured for generating an annular ring of light. The beam-forming optics being configured for generating from the light beam an excitation beam having a central lobe and at least one side lobe and also configured to direct the excitation beam to a position within a sample. The beam-forming optics can include an excitation objective having an axis oriented in a first direction. A transverse profile of the excitation beam in the sample is intermediate between a profile of a lowest order Bessel function and the Gaussian function. The microscope can also include imaging optics configured for receiving signal light from a position within the sample that is illuminated by the excitation beam and for imaging the received light on a detector. The imaging optics can include a detection objective having an axis oriented in a second direction that is non-parallel to the first direction where the signal light has a wavelength of $\lambda/2$. The microscope can also include a detector configured for detecting the signal light received by the imaging optics.

In another general aspect, a microscope includes a light source for generating a light beam having a wavelength, $\lambda$, and first beam-forming optics configured for receiving the light beam and generating a first Bessel-like beam that is directed into a sample. The beam-forming optics include a first excitation objective having a numerical aperture ($NA_{EO}$) and an axis oriented in a first direction. The microscope further includes imaging optics configured for receiving signal light from a position within the sample that is illuminated by the first Bessel-like beam and for imaging the received light on a detector. The imaging optics include a detection objective having a numerical aperture ($NA_{DO}$) and an axis oriented in a second direction that is non-parallel to the first direction. The microscope includes first beam-translation optics configured for translating the position of the first Bessel-like beam within the sample in discrete steps of more than or about $\lambda/2NA_{EO}$ to create a first excitation pattern of multiple first Bessel-like beams having a spatial period, $\Lambda$, equal to the distance between beam positions of neighboring steps and configured to create N−1 additional excitation patterns that are spatially phase shifted from the first excitation pattern by $(N-1)\Lambda/N$. The microscope includes a detector having individual detection units and configured for detecting first signal light received by the imaging optics, wherein the first signal light is emitted from the sample based an interaction of the first Bessel-like beam with the sample. The microscope includes a processor that is configured to generate a real space constituent image for each of the N excitation patterns, to Fourier transform each of the real space constituent images to generate reciprocal space constituent images for each of the excitation patterns, to combine the reciprocal space constituent images to generate a final reciprocal space image, and to re-transform the final reciprocal space image to generate a final real space image of the sample, where the final real space image of the sample has a resolution of less that $\lambda/2NA_{DO}$ in a coordinate orthogonal to the first direction.

The details of one or more implementations are set forth in the accompanying drawings and the description below. Other features will be apparent from the description and drawings, and from the claims.

DETAILED DESCRIPTION

Figure 1:
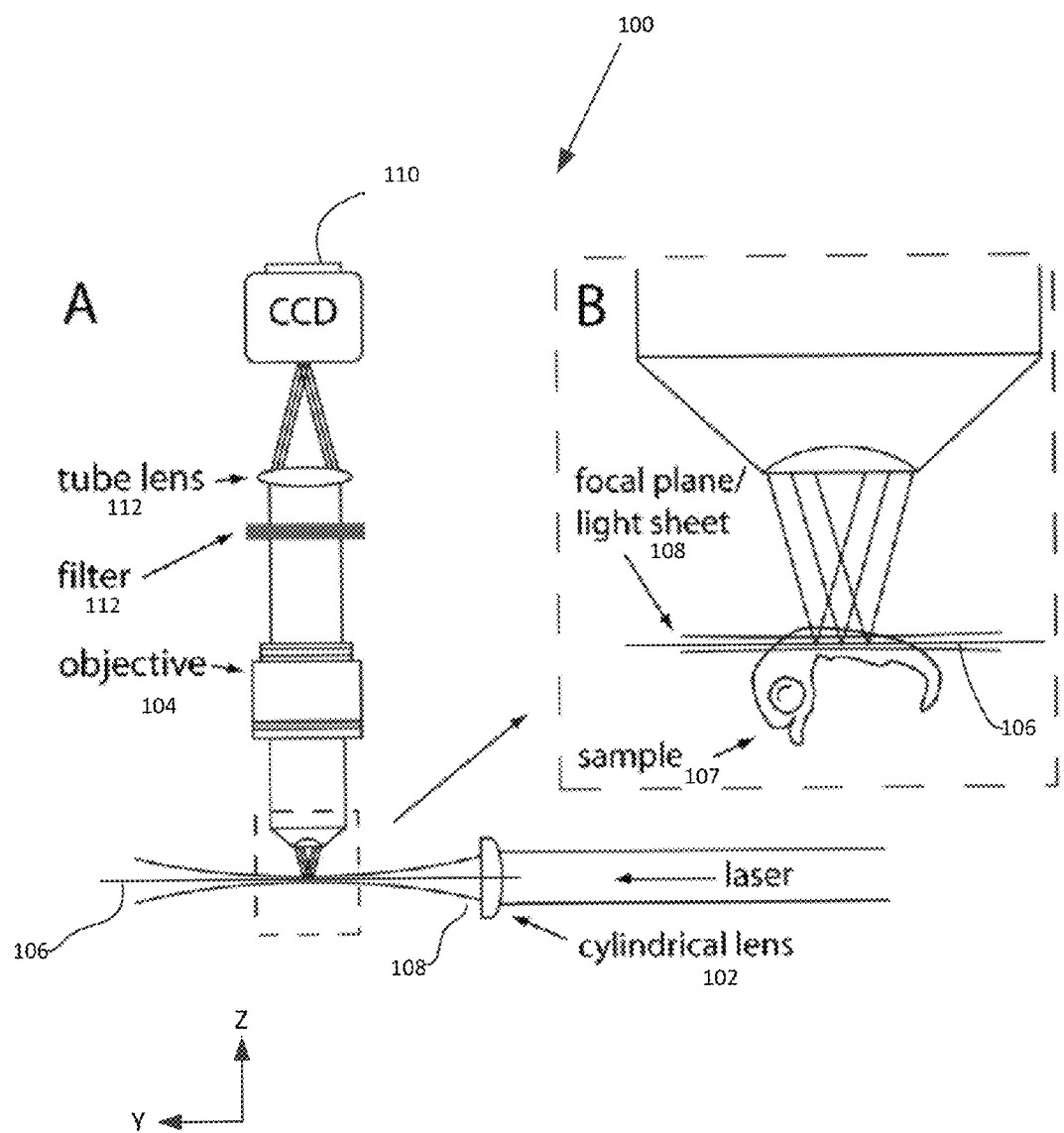
FIG. 1 is a schematic diagram of a light sheet microscopy (LSM) system.
Figure 2:
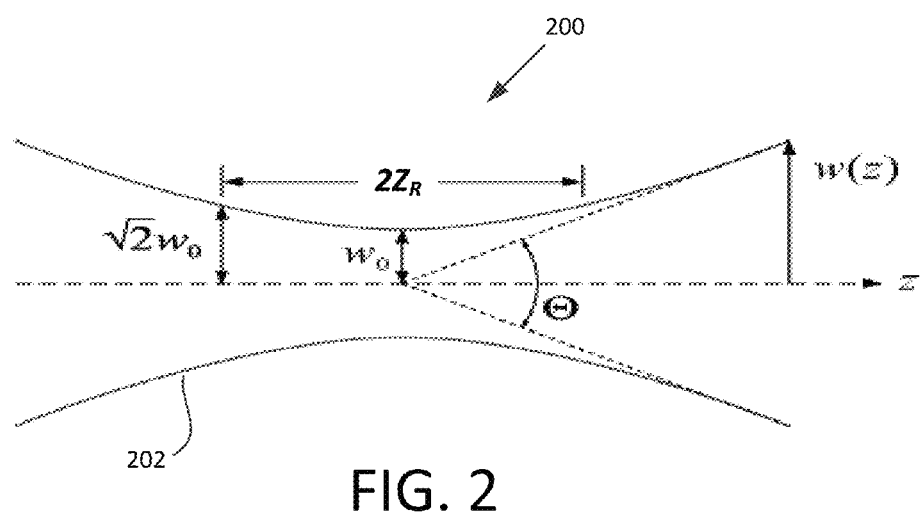
FIG. 2 is a schematic diagram of a profile of a focused beam of light.

This description discloses microscopy and imaging apparatus, systems, methods and techniques, which enable a light sheet or pencil beam to have a length that can be decoupled from its thickness, thus allowing the illumination of large fields of view (e.g., tens or even hundreds of microns) across a plane having a thickness on the order of, or smaller than, the depth of focus of the imaging objective by using illumination beams having a cross-sectional field distribution that is similar to a Bessel function. Such illumination beams can be known as Bessel beams. Such beams are created by focusing light, not in a continuum of azimuthal directions across a cone, as is customary, but rather at a single azimuthal angle or range of azimuthal angles with respect to the axis of the focusing element. Bessel beams can overcome the limitations of the diffraction relationship shown in FIG. 2, because the relationship shown in FIG. 2 is only valid for lenses (cylindrical or objectives) that are uniformly illuminated.

Figure 3:
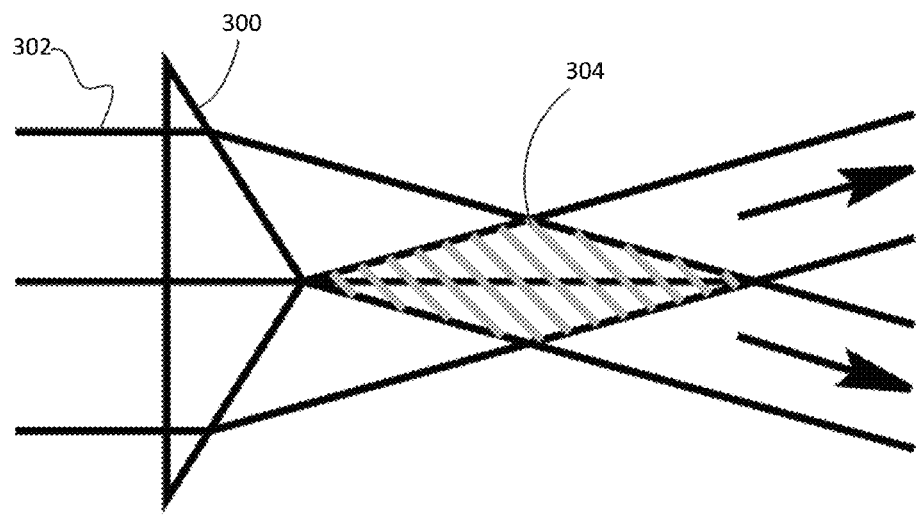
FIG. 3 is a schematic diagram of a Bessel beam formed by an axicon.

FIG. 3 is a schematic diagram of a Bessel beam formed by an axicon 300. The axicon 300 is a conical optical element, which, when illuminated by an incoming plane wave 302 having an approximately-Gaussian intensity distribution in directions transverse to the beam axis, can form a Bessel beam 304 in a beam that exits the axicon.

Figure 4:
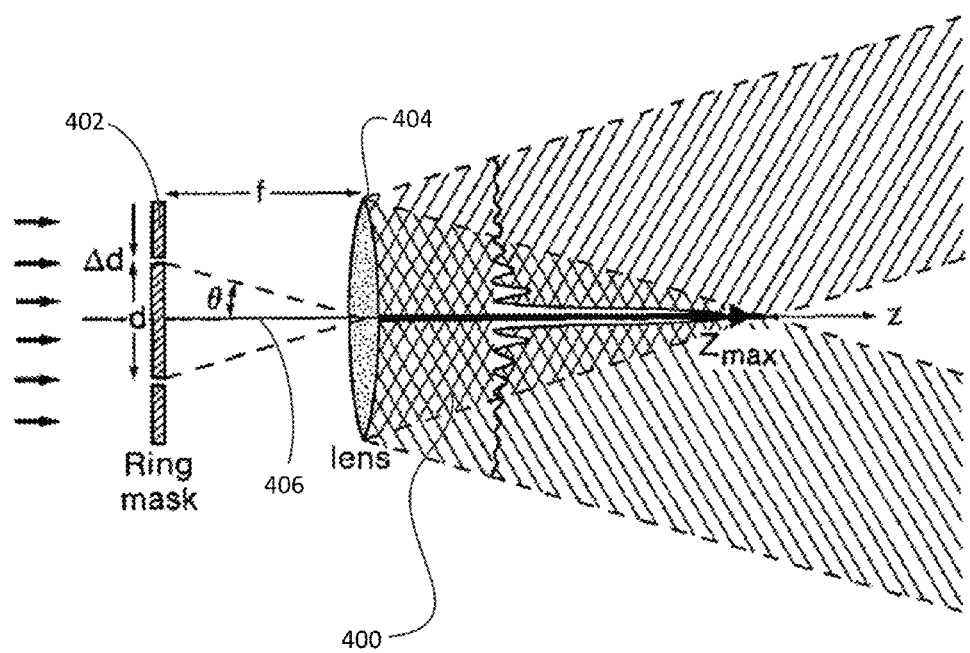
FIG. 4 is a schematic diagram of a Bessel beam formed by an annular apodization mask.

FIG. 4 is a schematic diagram of a Bessel beam 400 formed by an annular apodization mask 402, where the annular mask 402 is illuminated to create a thin annulus of light at the back focal plane of a conventional lens 404. The mask 402 is separated from the lens 404 by the focal length, f. An angle, θ, can be defined as the inverse tangent of half the distance, d, from the center of the annular ring to a point within the ring divided by the focal length, where $d_o$ can be used to denote the minimum diameter of the annular ring. Ideally, in either case shown by FIG. 3 or by FIG. 4, the axial wavevectors $k_z$ of all rays converging to the focus are the same, and hence there is no variation of the beam along this direction. In practice, the finite diameter of the axicon 300, or the finite width, Δd, of the annular ring in the apodization mask 402 restricts the Bessel beam to a finite length. The optical system of the annular apodization mask 402 and the lens 404 can be characterized by a minimum and maximum numerical aperture, where the maximum numerical aperture is proportional to $d_o+\Delta d$, and the minimum numerical aperture is proportional to $d_o$. In other implementations, different optical elements, other than an axicon or an apodization mask, can be used to create an annulus of light. For example, a binary phase mask or a programmable spatial light modulator can be used to create the annulus of light.

Figure 5:
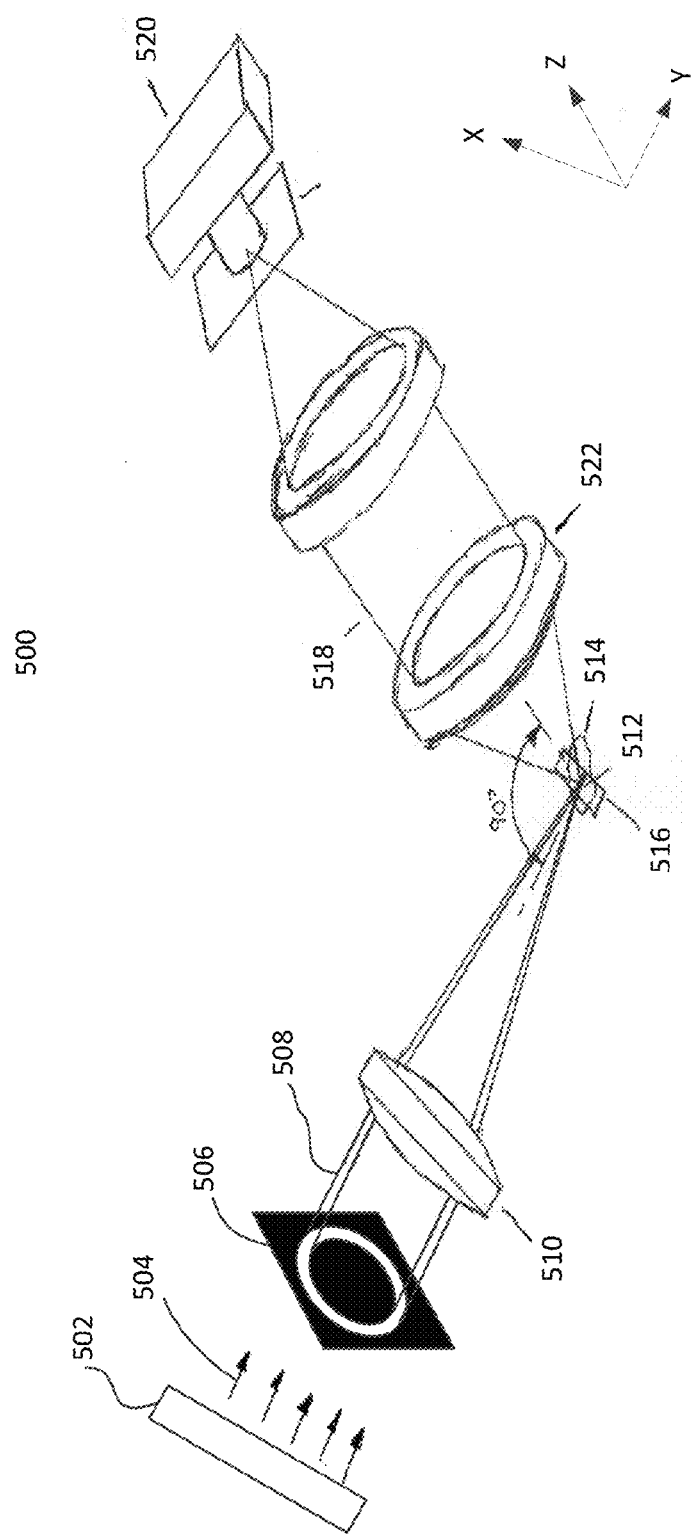
FIG. 5 is a schematic diagram of a system for Bessel beam light sheet microscopy.

FIG. 5 is a schematic diagram of a system 500 for Bessel beam light sheet microscopy. A light source 502 emits a light beam 504 that strikes an annular apodization mask 506. An annulus of excitation light 508 illuminates the back focal plane of microscope objective 510 to create an elongated Bessel beam 512 of light in a sample 514. By scanning this beam in a plane 516 transverse to the axis of the Bessel beam 512 and coincident with the focal plane of a detection objective 504 while simultaneously integrating the collected signal 518 with a camera 520 located at a corresponding image plane of imaging optics 522, an image is obtained from a much thinner slice within the sample than is the case when either conventional light sheet microscopy or DSLM is used.

Figure 6A:
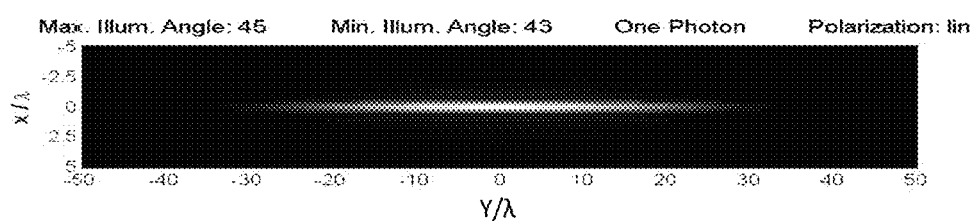
FIG. 6A is a plot of the intensity profile of a Bessel beam.
Figure 6B:
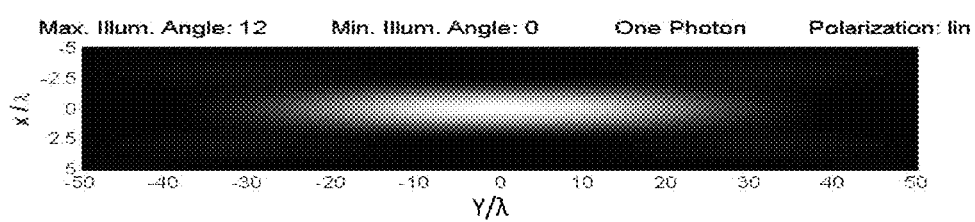
FIG. 6B shows a plot of the intensity profile of a conventional beam.
Figure 7A:
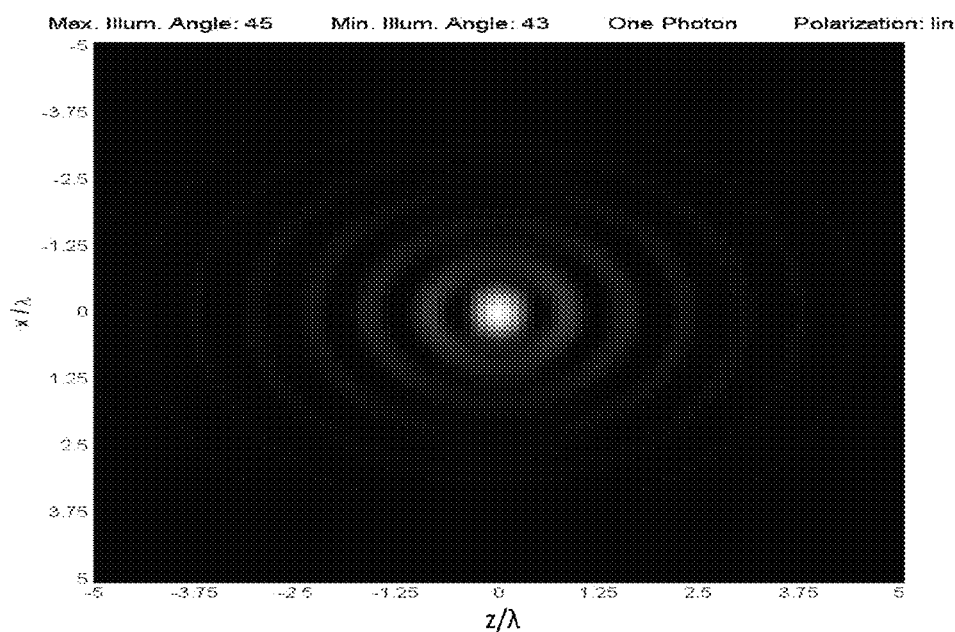
FIG. 7A is a plot of the intensity profile of a Bessel beam of FIG. 6A in the directions transverse to the propagation direction of the beam.
Figure 7B:
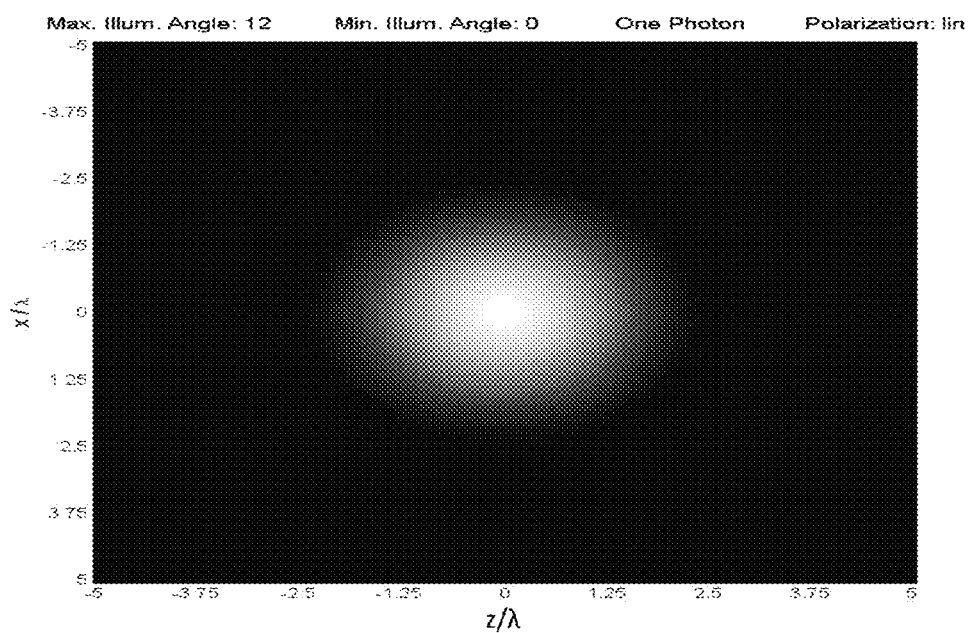
FIG. 7B is a plot of the intensity profile of the conventional beam of FIG. 6B in the directions transverse to the propagation direction of the beam.

How much thinner the sheet of excitation light can be with Bessel beam illumination than with conventional light sheet microscopy or DSLM can be seen from a comparison of FIG. 6A, which shows a plot of the intensity profile of a Bessel beam, and FIG. 6B, which shows a plot of the intensity profile of a conventional beam. In the plots of FIGS. 5 and 6, Y is along the axis of the propagation direction of the beam, X is the direction of the excitation polarization (when linearly polarized light is used), and Z is along the axis of detection optics objective 522 and is orthogonal to X and Y. FIG. 7A is a plot of the intensity profile of a Bessel beam of FIG. 6A in the directions transverse to the propagation direction of the beam, and FIG. 7B is a plot of the Gaussian intensity profile of the conventional beam of FIG. 7A in the directions transverse to the propagation direction of the beam.

As seen in FIG. 6A, annular illumination across a small range of angles (θ=43 to 45 degrees) results in a Bessel-like beam approximately 50 wavelengths λ long in the Y direction, or roughly the same length obtained by conventional illumination using a plane wave having a Gaussian transverse intensity profile that is focused by a lens into an illumination beam having a cone half-angle of 12 degrees, as seen in FIG. 6b. However, the thickness of the Bessel beam is much narrower than the thickness of the conventional beam, yielding a much thinner sheet of excitation when scanned across a plane.

Figure 8A:
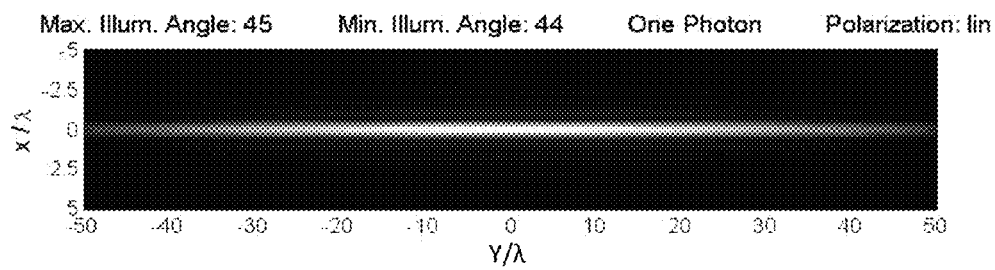
FIG. 8A is a plot of the intensity profile in the YZ plane of a Bessel beam generated from an annular mask having a thinner annulus in the annulus used to generate the intensity profile of the Bessel beam of FIG. 6A.
Figure 8B:
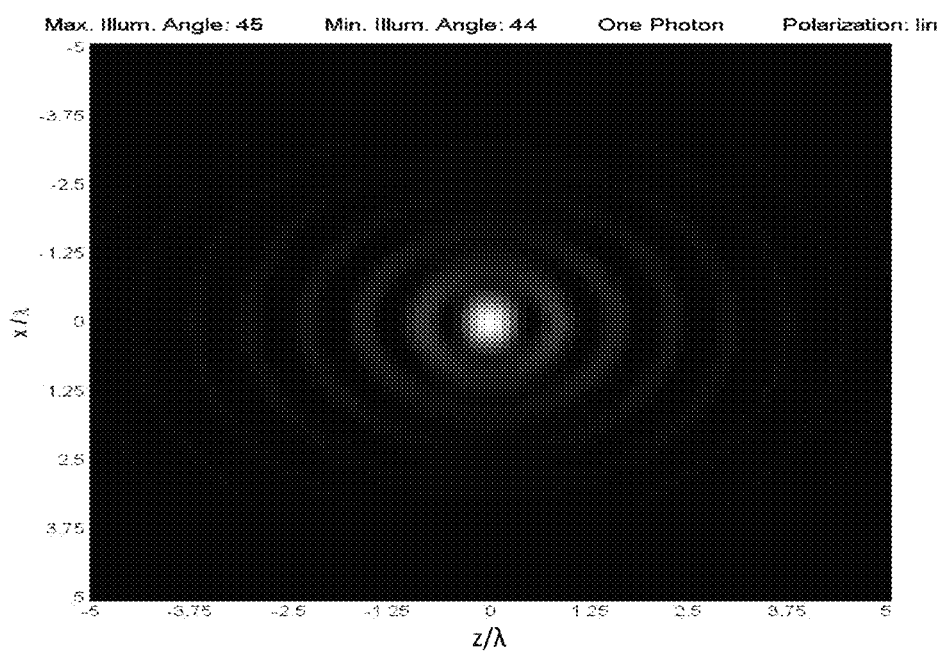
FIG. 8B is a plot of the transverse intensity profile in the XZ directions for the beam of FIG. 8A.

Furthermore, even longer Bessel-like beams can be made without compromising their cross-sectional width simply by restricting the annular illumination over an even smaller range of angles. FIG. 8A is a plot of intensity profile in the YZ directions of a Bessel beam generated from an annular mask having a thinner annulus that is used to generate the intensity profile of the Bessel-like beam of FIG. 6A, and FIG. 8B is a plot of the transverse intensity profile for the beam in the XZ directions. As shown in FIG. 8A, annular illumination across a small range of angles (θ=44 to 45 degrees) results in the YZ intensity profile of the Bessel-like beam shown in FIG. 8A, where the Bessel-like beam has a length of approximately 100 wavelengths in the Y direction. However, the transverse intensity profile of the longer Bessel beam is relatively unchanged compared with shorter Bessel beam, as can be seen from a comparison of FIG. 7A and FIG. 8B, and the thickness of the beam is not significantly greater than the thickness of the beam whose intensity profile is shown in FIG. 6A. In contrast, with conventional illumination the usual approach of lengthening the beam by reducing the NA results in an unavoidably larger diffraction limited cross-section, roughly in accordance with Table 1.

Figure 9A:
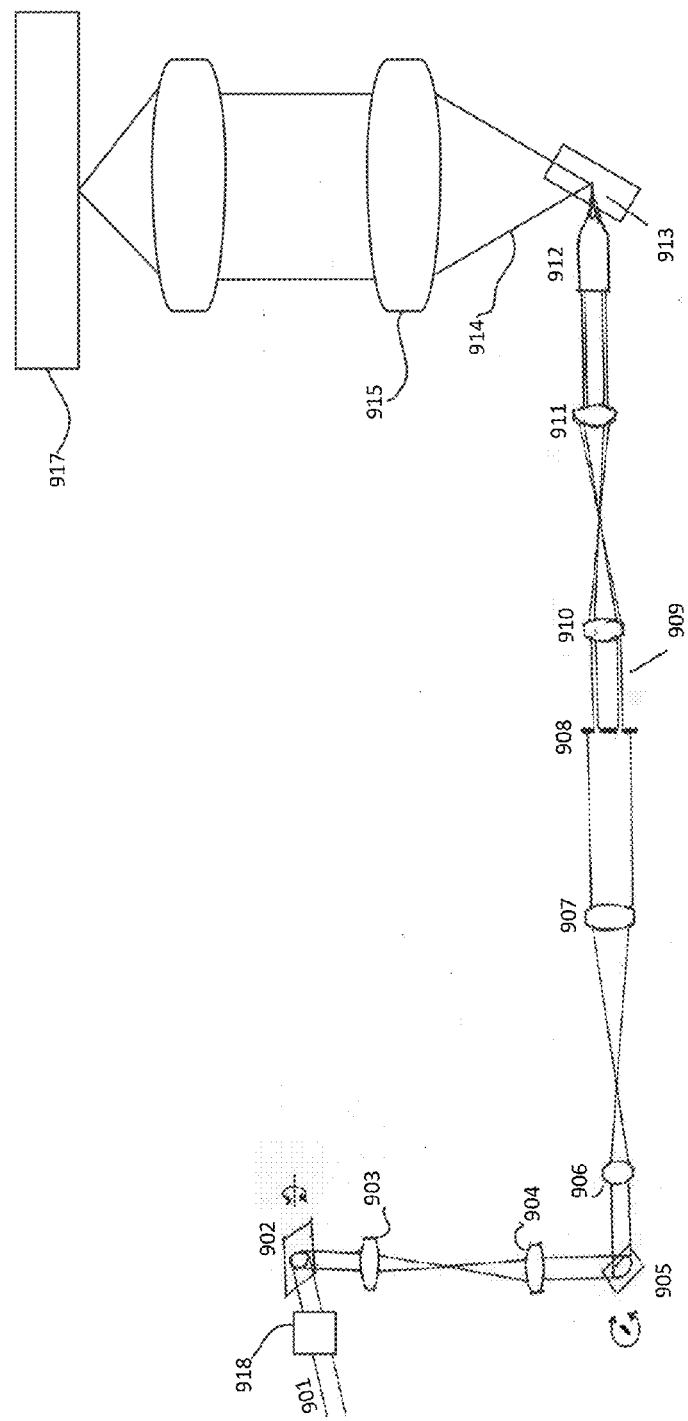
FIG. 9A is a schematic diagram of another system for implementing Bessel beam light sheet microscopy.

FIG. 9A is a schematic diagram of another system 900 for implementing Bessel beam light sheet microscopy. Collimated light 901, such as a laser beam having a Gaussian intensity profile, is reflected from first galvanometer-type mirror 902 and then imaged by relay lens pair 903 and 904 onto a second galvanometer-type mirror 905 positioned at a point optically conjugate to the first galvanometer-type mirror 902. A second lens pair 906 and 907 then relays the light to annular apodization mask 908 conjugate with the second galvanometer-type mirror 905. The annular light beam transmitted through this mask 908 is then relayed by a third lens pair 910 and 911 onto a conjugate plane coincident with the back focal plane of excitation objective 912. Finally, the annular light is focused by objective 912 to form a Bessel-like beam 913 that is used provides excitation light to a specimen.

The rotational axis of galvanometer mirror 902 is positioned such that tilting this galvanometer-type mirror 902 causes the Bessel-like beam 913 to sweep across the focal plane of detection objective 915 (i.e., in the X direction), whose axis is orthogonal to (or whose axis hasn't orthogonal complement to) the axis of the excitation objective 912. The signal light 914 can be directed by detection optics, including the detection objective 915, to a detection camera 917. The galvanometers-type mirrors 902, 905 can provide sweep rates of up to about 2 kHz, and with resonant galvanometer-type mirrors (e.g., Electro-Optical Products Corp, model SC-30) sweep rates can exceed 30 kHz. Extremely high frame rate imaging is then possible when the system is used in conjunction with a high frame rate detection camera (e.g., 500 frames/sec with an Andor iXon+DU-860 EMCCD, or >20,000 frames/sec with a Photron Fastcam SA-1 CMOS camera coupled to a Hamamatsu C10880-03 image intensifier/image booster).

The rotational axis of the galvanometer mirror 905 is positioned such that tilting of this mirror causes Bessel-like beam 913 to translate along the axis of detection objective 915. By doing so, different planes within a specimen can be accessed by the Bessel beam, and a three dimensional (3D) image of the specimen can be constructed, with much higher axial resolution than in conventional light sheet microscopy, due to the much narrower sheet of excitation afforded by Bessel-like excitation. In order to image each plane in focus, either detection objective 915 must be moved synchronously with the motion of the Bessel beam 913 imparted by the tilt of galvanometer-type mirror 905 (such as with a piezoelectric transducer (e.g., Physik Instrumente P-726)), or else the effective plane of focus of the detection objective 915 must be altered, such as by using a second objective to create a perfect image of the sample. Of course, if 3D image stacks are not desired, the second galvanometer 905 and relay lenses 906 and 907 can be removed from the system shown in FIG. 9A, and the first galvanometer 902 and relay lenses 903 and 904 can be repositioned so that the apodization mask 908 is at a conjugate plane relative to galvanometer-type mirror 902. An acousto-optical tunable filter (AOTF) 918 can be used to block all excitation light from reaching the specimen when desired.

The system in FIG. 9A is typically quite wasteful of the energy in light beam 901, because most of this light is blocked by apodization mask 908. If greater efficiency is desired, a diffractive optical element such as a binary phase mask or spatial light modulator and a collimating lens can be used to create an approximately annular light beam prior to more exact definition of this beam and removal of higher diffractive orders by the apodization mask 908.

Figure 9B:
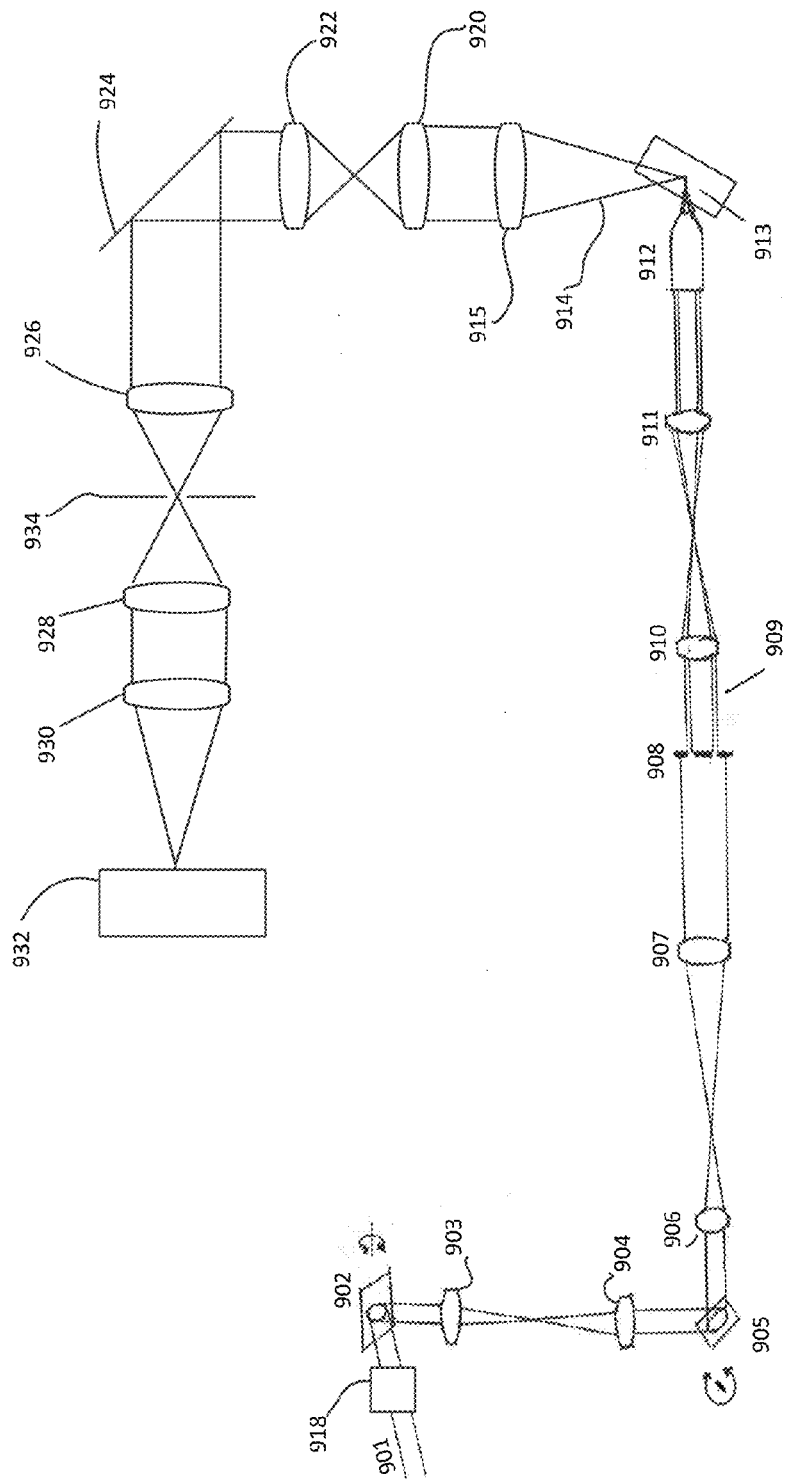
FIG. 9B is a schematic diagram of another system for implementing Bessel beam light sheet microscopy.

In another implementation, shown in FIG. 9B, signal light 914 received by detection objective 915 can be transmitted through relay lenses 920, 922 and reflected off a galvanometer-type mirror 924 and then transmitted through relay lenses 926 and 928 and focused by a tube lens 930 onto a detector 932. An aperture mask (e.g., an adjustable slit) 934 can be placed at a focal plane of lens 926, and when the mask defines a slit, the width of the slit 934 can be selected to block signal light from positions in the sample corresponding to side lobes of the Bessel-like beam illumination light, while passing signal light from positions in the sample corresponding to the central peak of the Bessel-like beam illumination light. The galvanometer-type mirror 924 can be rotated in conjunction with galvanometer-type mirror 902, so that when the Bessel-like beam is scanned in the X direction within the sample signal light from different positions within the sample passes through the slit 934.

Figure 10:
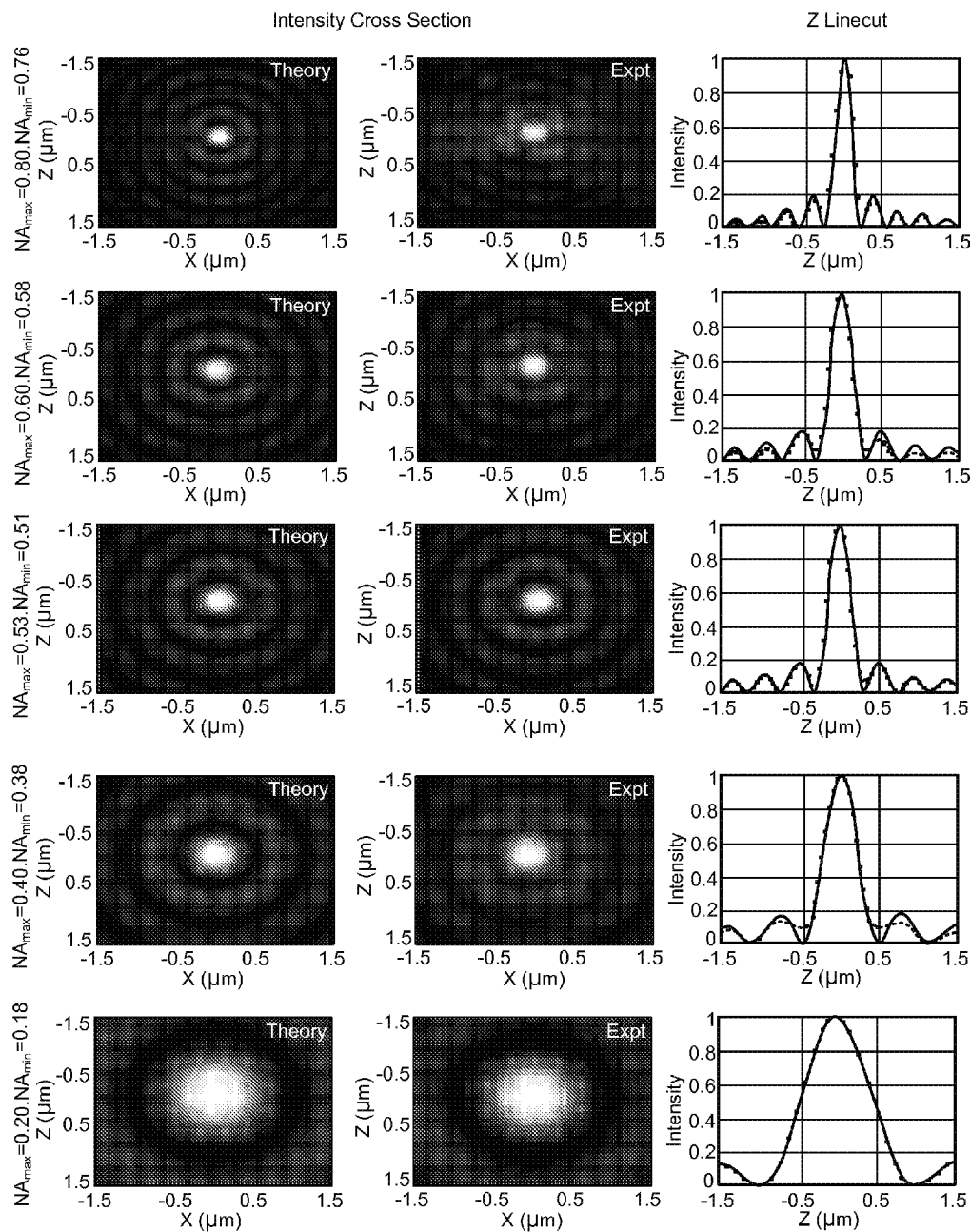
FIG. 10 shows a number of transverse intensity profiles for different Bessel-like beams.

Bessel-like beams include excitation intensity in rings other than the central excitation maximum, which as are evident in FIGS. 7A and 8B, and substantial energy resides in the side lobes of a Bessel-like beam. Indeed, for an ideal Bessel beam of infinite extent, each side lobe contains energy equal to that in the central peak. Also, for an ideal Bessel beam the ratio of the Rayleigh length of the beam to the minimum waist size of the beam is infinite. FIG. 10 shows a number of transverse intensity profiles for different Bessel-like beams. In FIG. 10, the first column shows theoretical two-dimensional intensity plots in the XZ plane, the second column shows experimental intensity plots in the third column shows a one-dimensional intensity profile at the X=0 plane. Different rows in FIG. 10 correspond to Bessel-like beams that are created using different annular apodization masks. Each row indicates the maximum and minimum numerical aperture of the annular ring of the mask. In the first row, the maximum numerical aperture is 0.80, and the minimum numerical aperture is 0.76. In the second row, the maximum numerical aperture is 0.60, and the minimum numerical aperture is 0.58. In a third row, the maximum numerical aperture is 0.53 and the minimum numerical aperture is 0.51. In the fourth row the maximum numerical aperture is 0.40, and the minimum numerical aperture is 0.38. In the fifth row, the maximum numerical aperture is 0.20, and the minimum numerical aperture is 0.18.

Figure 11A:
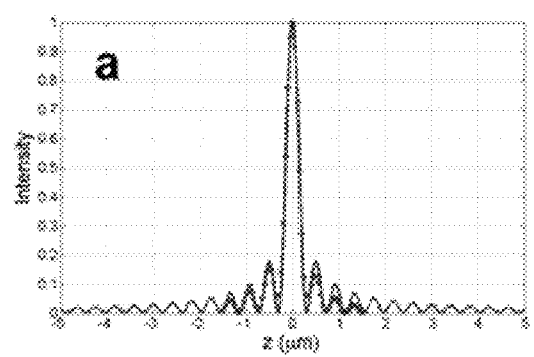
FIG. 11A shows the theoretical and experimental one-dimensional intensity profile of a Bessel-like beam at the X=0 plane.
Figure 11B:
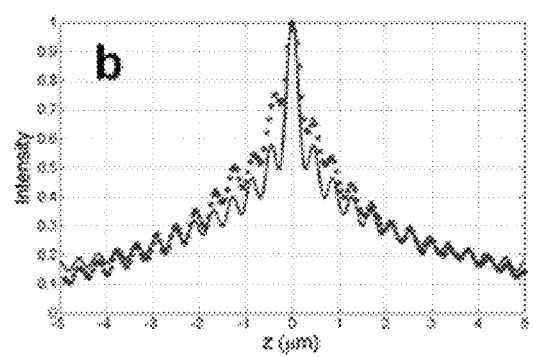
FIG. 11B shows an integrated intensity profile when the Bessel beam of FIG. 11A is swept in the X direction.

Because of the intensity in the side lobes, the integrated fluorescence excitation profile after the beam is swept in the X direction exhibits broad tails, as shown in FIG. 11. FIG. 11A shows the theoretical and experimental intensity profile in the Z direction of a Bessel-like beam, when the center of the beam is fixed at the X=0 and Z=0 plane, where experimental values are shown by dots and theoretical values are shown by solid lines. The intensity profile shown in FIG. 11A is representative of a Bessel-like beam formed from an annular apodization mask that generates an annulus of 488 nm light at a rear pupil of an excitation objective, where the annulus has a maximum numerical aperture of 0.60 and a minimum numerical aperture of 0.58. When this Bessel-like beam is swept in the X direction to create a sheet of excitation light centered on the Z=0 plane, integrated fluorescence excitation profile shown in FIG. 11B results because of the side lobes in the beam. Thus, the side lobes of the Bessel beam can contribute out-of-focus background fluorescence and premature photobleaching of the sample. A number of techniques can be used to mitigate the effect of these lobes.

Figure 12A:
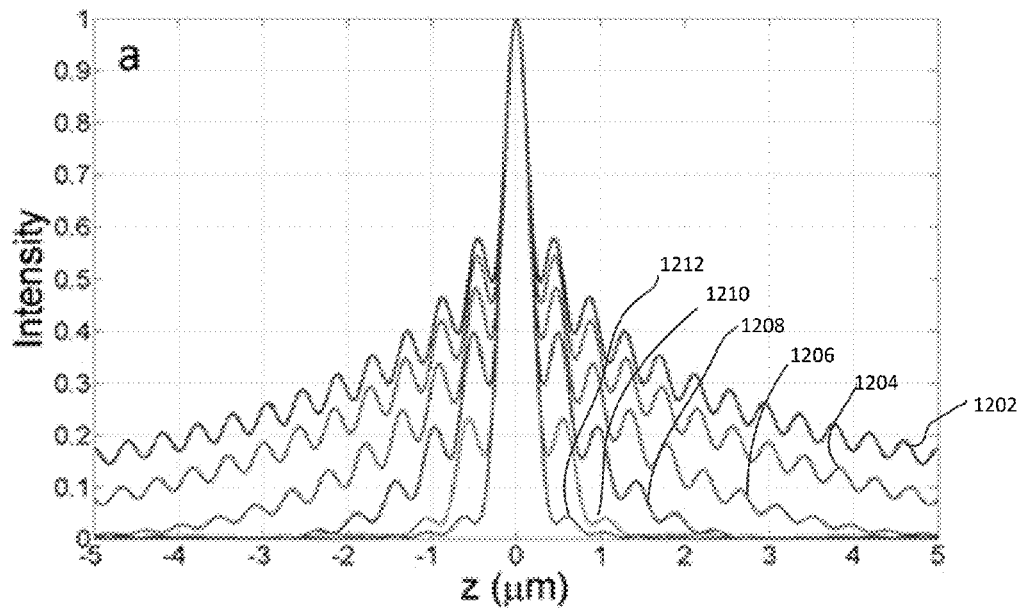
FIG. 12A shows plots of the width of fluorescence excitation profiles of a swept beam, where the beam that is swept is created from annuli that have different thicknesses.
Figure 12B:
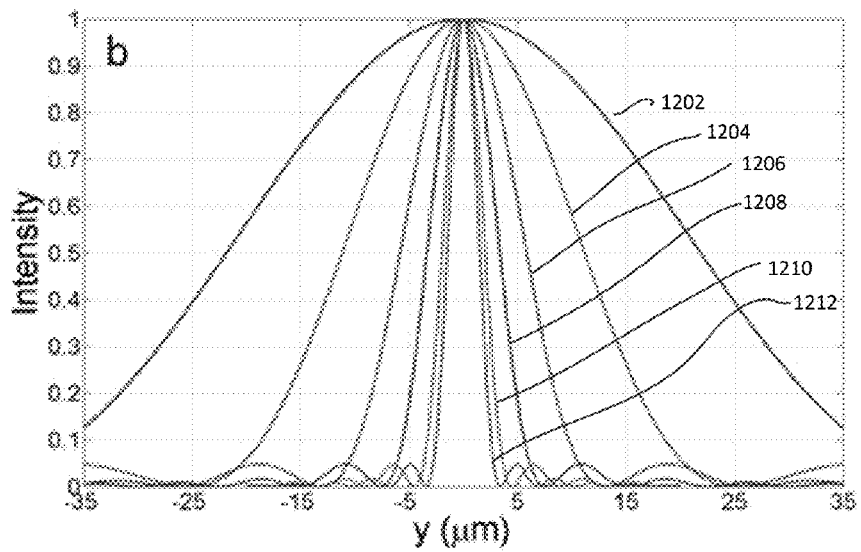
FIG. 12B shows plots of the axial intensity profile of the beam that is swept in the Z direction.

Choosing a thicker annulus in the annular mask 506 suppresses these tails, but it does so at the expense of the length of the beam, as the beam becomes more Gaussian and less Bessel-like in character. This effect can be seen in FIG. 12A and FIG. 12B. FIG. 12A shows plots of the width of fluorescence excitation profiles of beams swept in the X direction in the Z=0 plane, where the beams that are swept are created from annuli that have different thicknesses. FIG. 12B shows plots of the axial intensity profiles (i.e., in the Y direction) of the beams that are swept. For each of the beams whose intensity profiles are plotted in FIG. 12A and FIG. 12B, the maximum numerical aperture is 0.60. A beam with an intensity profile 1202 has a minimum numerical aperture equal to 0.58. A beam with an intensity profile 1204 has a minimum numerical aperture equal to 0.56. A beam with an intensity profile 1206 has a minimum numerical aperture people equal to 0.52. The beam with an intensity profile 1208 has a minimum numerical aperture equal to 0.45. A beam with an intensity profile 1210 has a minimum numerical aperture equal to 0.30. A beam with an intensity profile 1212 as a minimum numerical aperture equal to 0.00, i.e., it is equivalent to the Gaussian beam that fully illuminates a circular aperture.

Thus, as can be seen from a comparison of the plot FIG. 12A and FIG. 12B, a trade-off exists between minimizing the deleterious effects of the side lobes of the beam and maximizing the axial length of the field of view of the beam. Therefore, by selecting an annulus having a thickness that achieves a length of the field of view that is just sufficient to cover a region of interest in a specimen, but that is not substantially longer than the region of interest, the deleterious effects of the side lobes can be minimized. Therefore, the system 500 shown in FIG. 5, can include a plurality of different apodization masks 506 in which the thickness of the open annular region various, and a particular one of the apodization masks 506 can be selected to image a region of the specimen 514, where the selected mask is chosen such that the length of the field of view of beam just covers the region of interest. When referring to FIG. 4, the different apodization masks can have open regions with different widths, Δd.

Thus, a comparison of the plots in FIG. 12A and FIG. 12B shows the profiles of the beam changing from a profile that best approximates that of a lowest order ($J_0$) Bessel function (plot 1202) to a Gaussian profile (1212). This comparison indicates that the deleterious effect of the side lobes can be reduced by using a beam having a profile that is not substantially similar to that of a Bessel function, at the expense of having a beam with a shorter axial length. This means that it can be advantageous to select a beam profile having a minimum length necessary to create the desired image, so that the effect of the side lobes of the beam, which create background haze and photobleaching, can be minimized. Thus, the beam that may be selected may not have a profile that approximates that of a Bessel function, but the beam also may not have a profile of a Gaussian beam, because the annular mask 506 blocks the portion of the incoming light 504 on the axis of the excitation objective 510 such that the $k_z=0$ of the beam 516 are removed. In particular, in one implementation the selected beam can have a ratio of a Rayleigh length, $z_R$ to a minimum beam waist, $w_o$, of more than $2\pi w_o/\lambda$ and less than $100\pi w_o/\lambda$. In another implementation, the selected beam can have a non-zero ratio of a minimum numerical aperture to a maximum numerical aperture of less than 0.95. In another implementation, the selected beam can have a non-zero ratio of a minimum numerical aperture to a maximum numerical aperture of less than 0.9. In another implementation, the selected beam can have a ratio of a minimum numerical aperture to a maximum numerical aperture of less than 0.95 and greater than 0.80. In another implementation, the selected beam can have a non-zero ratio of a minimum numerical aperture to a maximum numerical aperture of less than 0.9. In another implementation, the selected beam can have a ratio of a minimum numerical aperture to a maximum numerical aperture of less than 0.95 and greater than 0.80. In another implementation, the selected beam can have a ratio of energy in a first side lobe of the beam to energy in the central lobe of the beam of less than 0.5.

The length of the beam 516, which is necessary to image a specimen can be reduced by tilting a cover slip that supports the specimen with respect to the direction of the incoming beam 516. For example, if a specimen that resides on a cover slip is 5 μm thick in the direction normal to the cover slip and has lateral dimensions of 50 μm×50 μm then, if the cover slip lies in the Z=0 plane, the beam 516 would have to be 50 μm long to span the specimen. However, by tilting the plane of the cover slip at a 45° angle to the direction of the incoming beam 516, then the beam would only need to be 5 μm×√2 long to span the sample. Thus, by placing a thin specimen on a cover slip and tilting the cover slip with respect to the direction of the incoming beam, a shorter length beam can be used, which has the advantage of reducing the effect of background haze and photobleaching due to side lobes of the beam. To image the specimen on a tilted cover slip, the beam 516 can be scanned in the X direction by tilting the galvanometer-type mirror 902, and can be scanned in the Z direction either by introducing a third galvanometer (not shown) and a third pair of relay lenses (not shown) into the system 900 shown in FIG. 9A to scan the beam 516 in the Z direction or by translating the Z position of the specimen, e.g., via a piezoelectric transducer (not shown and FIG. 9A) coupled to the cover slide that supports the specimen. This mode of operation in which a specimen on a cover slip is imaged when the cover slip is tilted (e.g., at an angle between 10 and 80 degrees) with respect to the direction of the incoming illumination beam can be used to image thin (e.g., less than 10 μm thick) specimens, such as individual cells that are mounted or cultured on to the cover slip.

Another approach to isolate the central peak fluorescence from that generated in the side lobes is to exclude the latter via confocal filtering with a virtual slit. When the detector includes a plurality of individual detector elements, only those elements of the detector upon which an image the portion of the sample that is illuminated by the central lobe of the illumination beam can be activated to record information that is used to generate an image, while the individual detector elements upon which an image of the portion of the sample that is illuminated by side lobes of the illumination beam are not activated, such that they do not record information that is used to generate an image.

Figure 13A:
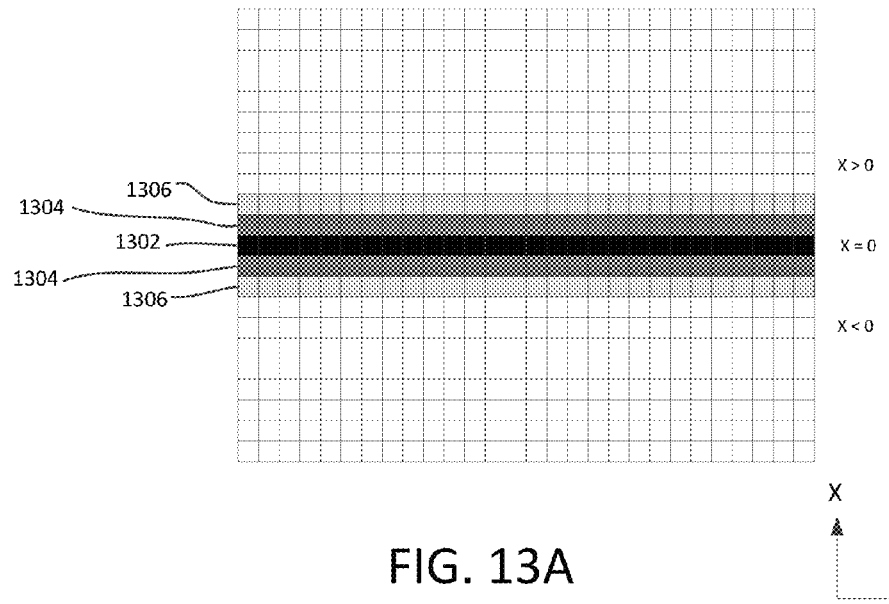
FIG. 13A is a schematic diagram of a surface of a detector having a two-dimensional array of individual detector elements in the X-Y plane.

For example, FIG. 13A is a schematic diagram of a surface of a detector having a two-dimensional array of individual detector elements in the XY plane. When the center of the central lobe of the excitation beam is located at X=0 and side lobes are located at X>0 and X<0, then the detector elements 1302 onto which fluorescence or detection light is focused from the X=0 position within the specimen at the focal plane of the detection objective 915 (or detector elements corresponding to the smallest absolute value of X for a particular Y position) can be activated to record information, while neighboring detector elements corresponding to higher absolute values of X for the particular Y position can be un-activated such that they do not record information that is used to generate an image. As shown in FIG. 13A, detector elements 1302 located on the detector surface at positions that correspond most closely with fluorescence light from X=0 positions within the specimen can be activated to record information, while neighboring detector elements 1304, 1306 are unactivated, so they do not record fluorescence light from positions within the sample that are not illuminated by the central portion of the excitation beam.

Figure 13B:
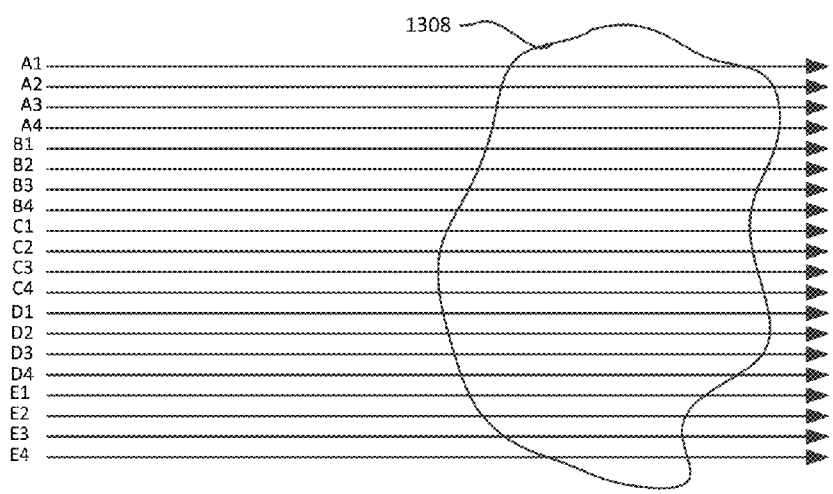
FIG. 13B is a schematic diagram of "combs" of multiple Bessel-like excitation beams that can be created in a given Z plane, where the spacing in the X direction between different beams is greater than the width of the fluorescence band generated by the side lobes of the excitation beams.

FIG. 13B is a schematic diagram of "combs" of multiple Bessel-like excitation beams that can be created in a given Z plane. A comb of beams can be created by inserting a diffractive optical element (DOE, not shown) in the beam path between the light source and the galvanometer-type mirrors 902, 905, where the DOE diffracts a plurality of beams at different angles from the DOE, which end up being parallel to and spatially shifted from each other within the specimen. In the specimen at the focal plane of the detection objective, the spacing in the X direction between different beams of the comb is greater than the width of the fluorescence band generated by the side lobes of the beams. This allows information to be recorded simultaneously from rows of individual detector elements corresponding to the centers of the different beams of the comb, without the side lobes of neighboring beams interfering with the recorded signal for a particular beam.

For example, as shown in FIG. 13B, a comb of beams that illuminate a plane of a specimen 1308 can include the beams A1, B1, C1, D1, and E1, where the beams are separated by distances great enough so that side lobes of one beam in the comb do not overlap with a central portion of a neighboring beam. In this manner, multiple "stripes" of an image can be simultaneously recorded. This process is then repeated, with additional images collected as the comb of Bessel-like illumination beams is translated in discrete steps having a width that corresponds to the spacing in the X direction between individual detector elements until all "stripes" of the final image have been recorded. For example, the beams can be moved to new positions of A2, B2, C2, D2, and E2, where the spacing between the positions A1 and A2, the spacing between positions B1 and B2, etc. corresponds to the spacing between neighboring individual detector elements in the detector. Thus, fluorescence light from the beam position C1 could be detected at a detector element 1302, while fluorescence light from the beam position C2 can be detected at individual detector elements 1304. The image is that then digitally constructed from the information in all of the different stripes of the image. An acousto-optical tunable filter (AOTF) 918 can be used to block all excitation light from reaching the specimen between steps.

Another technique to reduce the influence of the side lobes and to improve the point reduce the Z-axis size of the field of view from which detection light is received to employ structured illumination (SI) based optical sectioning. In a widefield $\lambda$, microscopy implementation of SI, a periodic excitation pattern is projected through an epi-illumination objective to the focal plane of the objective, and three images of a sample, $I_n$ (n=1, 2, 3), are acquired as the pattern is translated in steps of ⅓ of the period of the pattern. Since the observable amplitude of the pattern decreases as it becomes increasingly out of focus (i.e., in a direction perpendicular to the focal plane), combining the images according to:

$$I_{final} = \left| \sum_{n=1}^{N} I_n \exp(2\pi i n / N) \right| \quad (1)$$

with N=3 removes the weakly modulated out-of-focus component and retains the strongly modulated information near the focal plane. In equation (1), I is an intensity at a point in the image, and n is an index value indicating an image from which $I_n$ is taken. Equation (1) is by one example of a linear combination of the individual images that will remove the weakly modulated out-of-focus component and retain the strongly modulated information near the focal plane.

To use SI using a Bessel-like beam with a wavelength, $\lambda$, that illuminates a thin plane of a specimen and where light is emitted in a direction perpendicular to (or in a direction with a component perpendicular to) the illumination plane, the beam is not swept continuously, but rather is moved in discrete steps to create a pattern of illumination light from which an image $I_n$ can be generated. When the stepping period is larger than or approximately equal to the minimum period of $\lambda/2NA_{Bessel}^{max}$ required to produce a resolvable grating, but smaller than or approximately equal to $\lambda/NA_{Bessel}^{max}$, the imposed pattern of illumination light contains a single harmonic, as required for the three-image, three-phase SI algorithm.

Thus, referring to FIG. 9A, the Bessel-like beam 913 can be swept in the X direction in discrete steps having a period greater than or approximately equal to $\lambda/2NA_{Bessel}^{max}$ and less than or approximately equal to $\lambda/NA_{Bessel}^{max}$ by controlling the position of the galvanometer-type mirror 902, and detection light can be received and signals corresponding to the detected light can be recorded by the detector 917 when the beam 913 is in each of the positions. While the galvanometer-type mirror is being moved from one position to the next position the illumination light can be blocked from reaching the sample by the AOTF. In this manner, an image $I_1$ can be generated from the detected light that is received when the illumination beam 913 is at each of its staff positions. Then, additional images, $I_2 \ldots I_N$, can be created by again stepping the beam 913 across the specimen in the X direction to create a pattern of illumination light, but with the patterns spatially shifted from the position of the first pattern by (i-1)/N of the period of the pattern, for i=2 to N. A final image of the specimen then can be constructed from the recorded signals through the use of equation (1).

Figure 14:
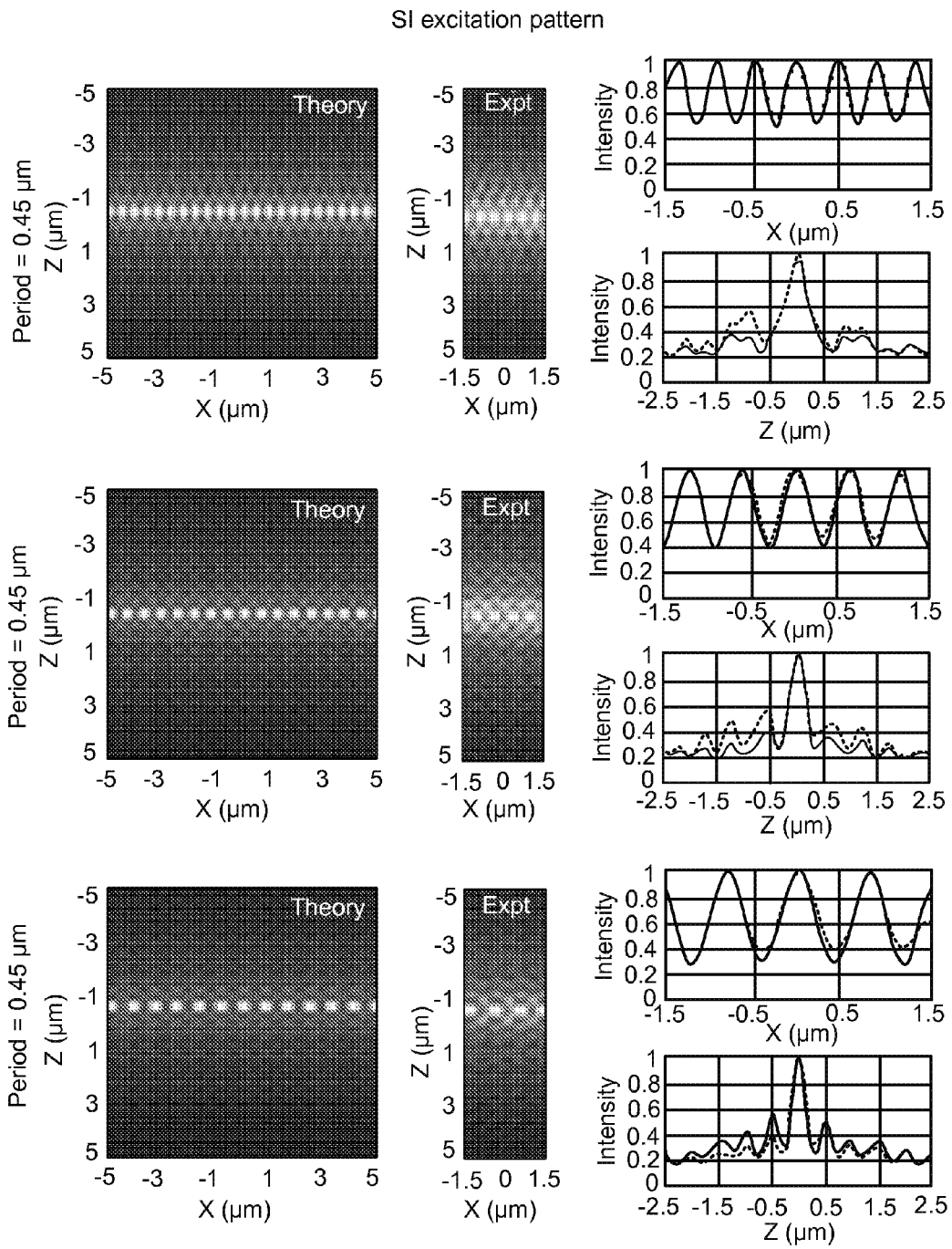
FIG. 14 shows theoretical and experimental single-harmonic structured illumination patterns that can be created with Bessel-like beams having a maximum numerical aperture of 0.60 and the minimum vertical aperture of 0.58, which are created with 488 nm light.

FIG. 14 shows a theoretical and experimental structured illumination patterns that can be created with a Bessel-like beams having a maximum numerical aperture of 0.60 and the minimum vertical aperture of 0.58, which are created with 488 nm light. The leftmost column of figures shows theoretical patterns, the middle column shows experimentally-measured patterns, and the third column shows one-dimensional intensity patterns for the Z=0 plane (top figure) and the X=0 (bottom figure) plane. In the first row of FIG. 14, the period the pattern (i.e., the spacing between successive positions of the center of the Bessel-like being is the beam is stepped in the X direction) is 0.45 µm. In the second row, the period of the pattern is 0.60 µm. In the third row the period of the pattern is 0.80 µm. As described above, a comb of multiple Bessel-like beams, which are spaced by more than the width of the fringes of the beams in the comb, can be used to illuminate the specimen simultaneously, and then the comb of beams can be stepped in the X direction using the step size described above, so that different stripes of the specimen can be imaged in parallel and then an image of the specimen can be constructed from the multiple stripes.

The excellent optical sectioning of the single harmonic SI mode results from the removal of the $k_x$=0 band in the excitation modulation transfer function (MTF) under application of Eq. (1). However, due to the energy in the Bessel side lobes, considerably more spectral energy exists in this band than in the two side bands, so that its removal proves wasteful of the photon budget and reduces the SNR of the final images substantially. Somewhat more energy can be transferred to the side bands using single harmonic excitation having a period far beyond the $\lambda/2NA_{detect}^{max}$ Abbe limit, but at the expense of proportionally poorer optical sectioning capability.

Figure 15:
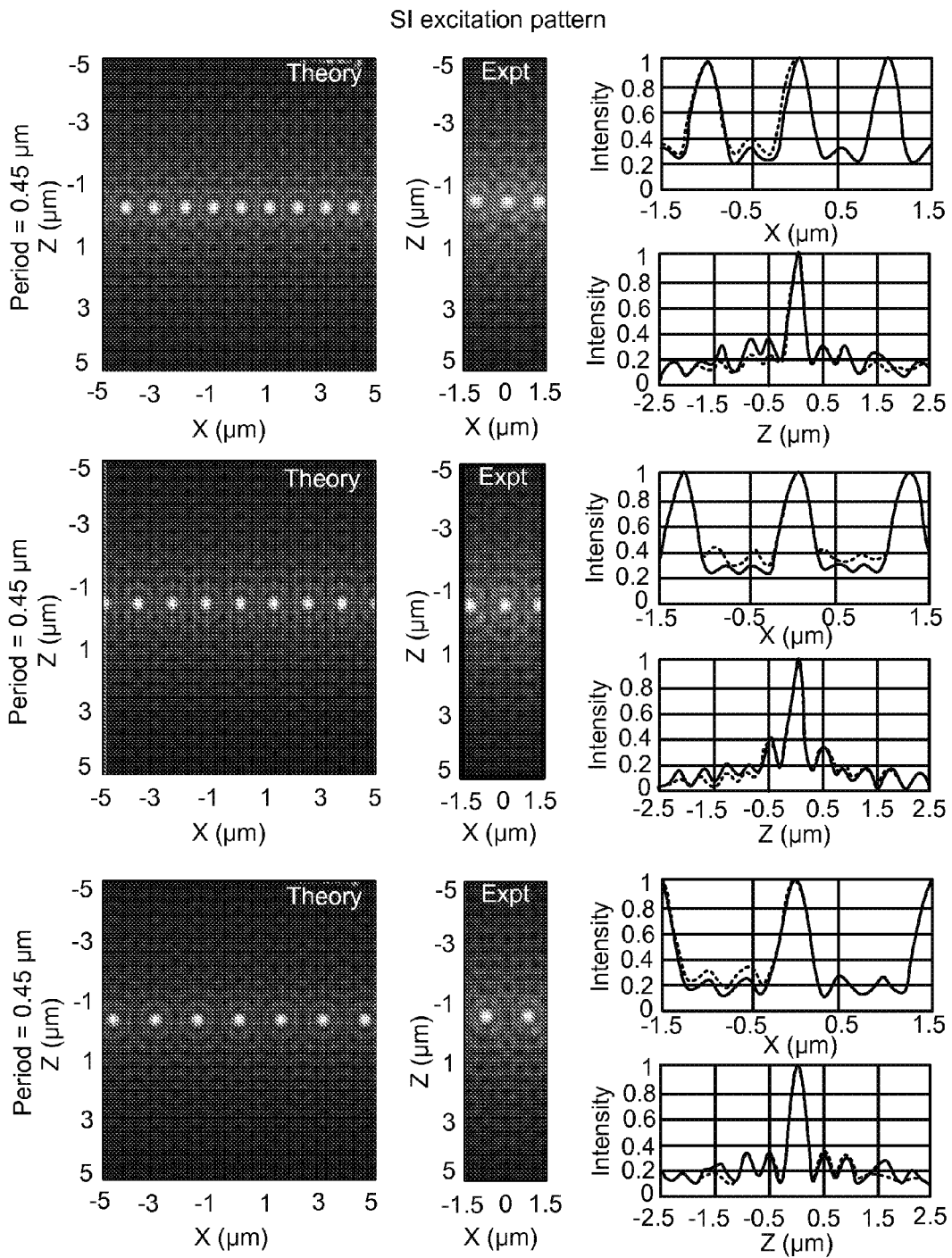
FIG. 15 shows theoretical and experimental higher-order harmonic structured illumination patterns that can be created with Bessel-like beams having a maximum numerical aperture of 0.60 and the minimum vertical aperture of 0.58, which are created with 488 nm light.

An alternative that can better retain both signal and axial resolution is to create a multi-harmonic excitation pattern by stepping the beam at a fundamental period larger than $\lambda/NA_{Bessel}^{max}$, as seen in FIG. 15, which shows theoretical and experimental higher-order harmonic structured illumination patterns that can be created with Bessel-like beams having a maximum numerical aperture of 0.60 and the minimum vertical aperture of 0.58, which are created with 488 nm light. To create a single SI image with a pattern having H harmonics, Eq. (1) is again used, except with N≥H+2 images, each with the pattern phase shifted by $2\pi/N$ relative to its neighbors. With increasing H, more side bands are generated in the MTF that contain a greater combined fraction of the total spectral energy relative to the $k_x=0$ band, thus yielding higher signal-to-noise (SNR) images. Due to the greater weighting of these sidebands to lower $k_z$, axial resolution (i.e., along the axis of the detection objective 915) of this multi-harmonic SI mode is slightly less (0.29 µm FWHM for N=9 phases) than in the single harmonic case, yet images of fixed and living cells still exhibit isotropic 3D resolution, albeit at the cost of more data frames required per image plane, and thus lower speed.

In addition to this speed penalty, both single-harmonic and multi-harmonic SI modes still generate some excitation beyond the focal plane, and are thus not optimally efficient in their use of the photon budget. Both these issues can be addressed using two-photon excitation (TPE), which suppresses the Bessel side lobes sufficiently such that a thin light sheet can be obtained even with a continuously swept beam. As a result, high axial resolution and minimal out-of-focus excitation is achieved in fixed and living cells with only a single image per plane. Some additional improvement is also possible with TPE-SI, but the faster TPE sheet mode can be preferred for live cell imaging. The benefits of TPE are not limited to structured illumination excitation of the specimen, but are beneficial during other modes of Bessel-like beam plane illumination of the specimen to reduce out of focus excitation and photo damage by the illumination beam. Other forms of non-linear excitation with a Bessel like beam, such as coherent anti-Stokes Raman scattering (CARS), can also reap similar benefits.

Thus, the improved confinement of the excitation light to the vicinity of the focal plane of the detection objective made possible by Bessel beam plane illumination leads to improved resolution in the axial direction (i.e., in the direction along the axis of the detection objective) and reduced photobleaching and phototoxicity, thereby enabling extended observations of living cells with isotropic resolution at high volumetric frame rates. For example, extended imaging of the endoplasmic reticulum in a live human osteosarcoma cell (U2OS cell line) in the linear multi-harmonic SI mode was performed. Despite the fact that over three-hundred image slices were required to construct each 3D image stack, the dynamics of the ER could be followed over 45 minutes at a rate of 1 stack/min with axial resolution of ~0.3 µm.

Even longer duration observations were found to be possible in the TPE sheet mode. For example, portions of three consecutive image stacks from a series of one hundred such stacks showed the evolution of numerous filopodia on the apical surface of a HeLa cell transfected with mEmerald/Lifeact. Significantly, the imaging speeds achievable in this mode (51.4 image planes/sec, 6 sec stack interval) enable even complex, rapid 3D cellular processes to be visualized with sufficient time resolution. This is further underscored by consecutive images of the retrograde flow of membrane ruffles formed at the leading edge of a transformed African green monkey kidney cell (COS-7 cell line, transfected with mEmerald/c-src). Such ruffles can surround and engulf extracellular fluid to create large intracellular vacuoles, a process known as macropinocytosis, which was directly demonstrated using the techniques described herein. The visualization of these processes in four dimensional spatiotemporal detail (0.12×0.12×0.15 µm×12.3 sec stack interval) across 15 minutes cannot currently be achieved with other fluorescence microscopy techniques.

For sufficiently bright samples, the pixel rate of EMCCD cameras becomes a limiting factor. To achieve even higher imaging speeds in such cases, a scientific CMOS camera (125 MHz, Hamamatsu Orca Flash 2.8) can be used. To exploit the full speed of the camera, a third galvanometer-type mirror that can be tilted can be placed at a plane conjugate to the rear pupil of the detection objective and used to tile several image planes across the width of the detector, which were then are read out in parallel.

Figure 16:
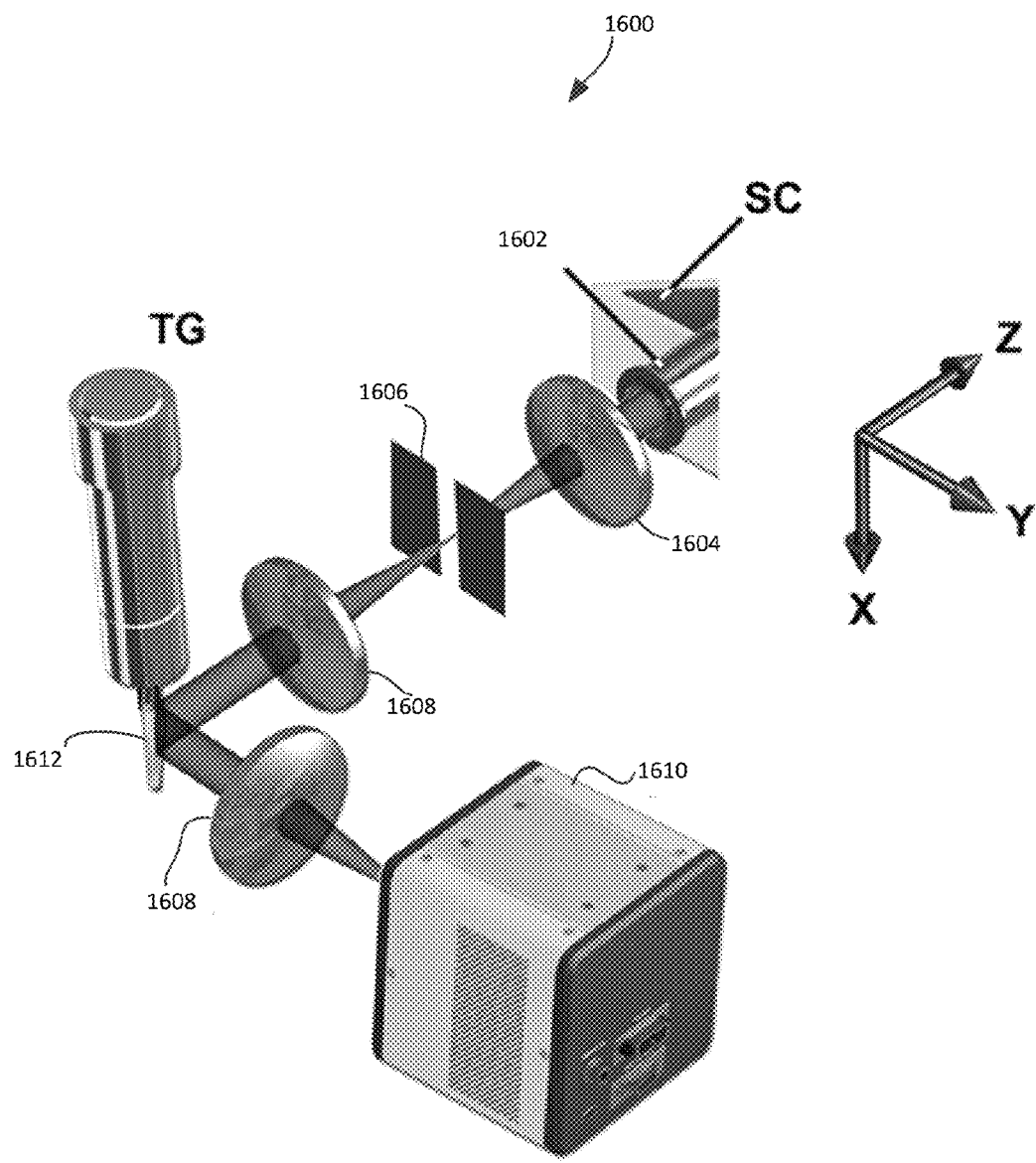
FIG. 16 shows a system with a galvanometer-type mirror placed at a plane that is conjugate to the detection objective between the detection objective and the detector.

FIG. 16 shows a system 1600 with a mirror placed at a plane that is conjugate to the detection objective between the detection objective and the detector. In the system 1600, detection light collected by detection objective 1602 can be focused by a tube lens 1604 to form an image at the plane of an adjustable slit 1606. The image cropped by the adjustable slit 1606 is reimaged by relay lenses 1608 onto a high-speed detection camera 1610. A galvanometer-type mirror 1612 is placed the plane between the relay lenses 1608 that is conjugate to the back focal plane of the detection objective 1612. By changing the angle of galvanometer-type mirror, multiple images can be exposed across the surface of the detection camera 1610 and then read out in parallel to exploit the full speed of the detection camera 1610.

With this configuration, the 3D dynamics of chromatid separation in early anaphase could be studied in the TPE sheet mode at rates of 1 volume/sec. Significantly, even at these imaging rates, the excitation did not arrest mitosis. Moreover, the intracellular trafficking of vesicles in a COS-7 cell could be observed over the course of 7000 frames acquired in a single plane at 191 frames/sec.

Three-dimensional live cell imaging can be performed with Bessel-like beans with the use of fluorescent proteins to highlight selected portions of a specimen. A key aspect of fluorescent proteins (FPs) is that their spectral diversity permits investigation of the dynamic interactions between multiple proteins in the same living cell. For example, after transfection with mEmerald/MAP4 and tdTomato/H2B, microtubules in a pair of U2OS cells surrounding their respective nuclei, were imaged in the linear, nine-phase multi-harmonic SI mode. Nevertheless, although many vectors are available for linear imaging, the need for N frames of different phase per image plane can limits the use of SI with Bessel-like beams to processes which evolve on a scale that matches the time required to collect frames at the desired spatial resolution. Of course, this limitation does not apply for fixed cells, where the linear SI mode is preferred, due to its superior axial resolution and the availability of a wider array of fluorescent dyes as well as FPs for protein specific labeling. For example, three-color isotropic 3D imaging of the actin cytoskeleton of an LLC-PK1 cell stained with Alexa Fluor 568 phalloidin, the nuclear envelope tagged with mEmerald/lamin B1, and nuclear histones tagged with mNeptune/H2B was performed.

For imaging multiple proteins exhibiting faster dynamics, the TPE sheet mode can be used. However, this presents its own challenges: orange/red FPs such as tdTomato and mCherry do not have the same TPE brightness and photostability of green FPs such as EGFP or mEmerald and require a second expensive ultrafast light source, since the time required to retune and realign a single source is prohibitive for live cell imaging. Fortunately, the 3D isotropic resolution of the Bessel TPE sheet mode permits multiple proteins tagged with the same FP to be imaged simultaneously, as long as they are known a priori to be spatially segregated. For example, the fragmentation of the Golgi apparatus between metaphase (t=0 min) and anaphase (t=10 min) was observed, as identified by chromosome morphology (green), and the re-constitution of the Golgi (t=20 min) around the daughter nuclei in telophase (t=40 min).

As described herein, Bessel beam plane illumination microscopy techniques offer 3D isotropic resolution down to ~0.3 μm, imaging speeds of nearly 200 planes/sec, and the ability, in TPE mode, to acquire hundreds of 3D data volumes from single living cells encompassing tens of thousands of image frames. Nevertheless, additional improvements are possible. First, substantially greater light collection making still better use of the photon budget would be obtained by using a detection objective with a numerical aperture of 1.0 or greater. Although mechanical constraints would thereby force the use of an excitation objective with a numerical aperture of less than 0.8 thus lead to a somewhat anisotropic point spread function (PSF), the volumetric resolution would remain similar, since the slight loss of axial resolution would be offset by the corresponding transverse gain.

As noted above, SI using the algorithm in Eq. (1) is also photon inefficient, as it achieves high axial resolution by removing substantial spectral energy that resides in the $k_x=0$ band of the MTF. An alternative would be to use the algorithms of 3D superresolution SI, which assign the sample spatial frequencies down-modulated by all bands of the excitation to their appropriate positions in an expanded frequency space. By doing so, shorter exposure times and fewer phases may be needed to record images of acceptable SNR, making linear Bessel SI a more viable option for high speed multicolor imaging. In addition, resolution could be extended to the sum of the excitation and detection MTF supports in each direction—an argument in favor of using three mutually orthogonal objectives. Indeed, the marriage of Bessel beam plane illumination and 3D superresolution SI may permit the latter to be applied to thicker, more densely fluorescent specimens than the conventional widefield approach, while more efficiently using the photon budget.

Superresolution SI can be performed by extending the structured illumination techniques described above with respect to FIG. 14 and FIG. 15. By illuminating the sample with a structured illumination pattern normally inaccessible high-resolution information can be accessed. An image of a sample can be made accessible in the form of moiré fringes. A series of such images can be processed to extract this high-frequency information and to generate reconstruction of the image with improved resolution compared to the diffraction limited resolution.

Figure 17:
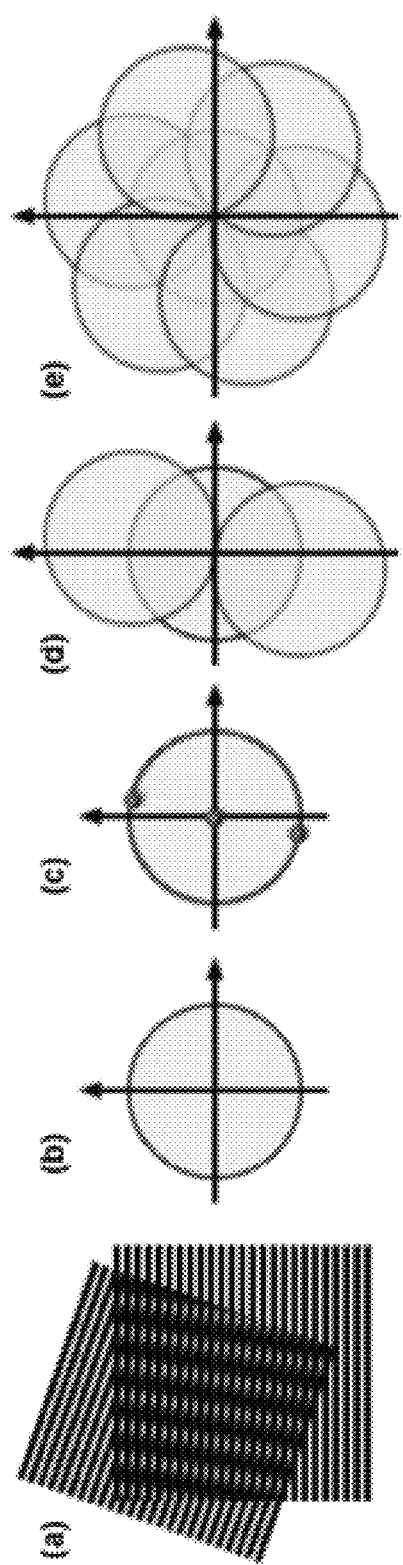
FIG. 17A shows two overlapping structured patterns.
FIG. 17B shows a reciprocal space representation of one of the patterns of FIG. 17A.
FIG. 17C shows a reciprocal space representation of the other pattern of FIG. 17A.
FIG. 17D shows an observable region of a reciprocal space representation of specimen structure shifted from the reciprocal space origin.
FIG. 17E shows observable regions of reciprocal space representations of specimen structure shifted from the reciprocal space origin, where the different representations correspond to different orientations and/or phrase of a structured pattern overlayed with the specimen structure.

The concept of super resolution SI exploits the fact that when two patterns are superimposed multiplicatively a beat pattern will appear in the product of the two images, as seen in FIG. 17A. In the case of Bessel-like beam plane illumination microscopy, one of the patterns can be the unknown sample structure, for example, the unknown spatial distribution of regions of the sample that receive illumination light and that emit signal light—and the other pattern can be the purposely structured pattern of excitation light that is written in the form of parallel Bessel-like beams. Because the amount of signal light emitted from a point in the sample is proportional to the product of the local excitation light intensity and the relevant structure of the sample, the observed signal light image that is detected by the detector will show the beat pattern of the overlap of the two underlying patterns. Because the beat pattern can be coarser than those of the underlying patterns, then because the illumination pattern of the Bessel-like beams is known, the information in the beat pattern can be used to determine the normally unresolvable high-resolution information about the sample.

The patterns shown in FIG. 17A can be Fourier transformed into reciprocal space. For example, the Fourier transform of the structure of a sample that is imaged by an optical system is constrained by the Abbe resolution limit would be represented by a circle having a radius of $2NA/\lambda$, as shown in FIG. 17B, where the low resolution components of the sample are close to the origin, and the high-resolution components are close to the edge of the circle. The Fourier transform of a 2D illumination pattern that consists of a sinusoidal variation in the illumination light in one dimension area having a period equal to the diffraction limit of the optical system has only three non-zero points that lie on the circle of FIG. 17B, as shown in FIG. 17C. One point resides at the origin and the other two points are offset from the origin in a direction defined by the orientation of the illumination pattern by distance a proportional to the inverse of the spatial period of the pattern. When the specimen is illuminated by structured illumination, the resulting beat pattern between the specimen structure and the illumination structure represents information that has changed position in reciprocal space, such that the observable region of the sample in physical space then contains new high-frequency information represented by the two regions and FIG. 17D that are offset from the origin.

In an implementation using a structured illumination pattern of Bessel-like beams, as explained above with respect to FIG. 14 and FIG. 15, three images can be recorded with the spatial phase of the illumination pattern shifted by 120° between each image in both the X direction and in the Z direction. Then, a Fourier transform can be performed on each of the three images, and the reciprocal space images are moved to their true positions in reciprocal space, combined through a weighted-average in reciprocal space, and then the weight-averaged reciprocal space image can be re-transformed to real space to provide an image of the sample. In this manner, a superresolution image of the sample can be obtained, where the resolution of the image in both the X and Z directions can be enhanced by a factor of two over the Abbe diffraction limited resolution.

In another implementation, more than one excitation objective can be used to provide a structured illumination pattern to the sample, where the different excitation objectives can be oriented in different directions, so that super resolution of the sample can be obtained in the directions transverse to the Bessel-like beams of each of the orientation patterns. For example, a first excitation objective can be oriented with its axis along the Y direction (as described above) and can illuminate the sample with an illumination pattern of Bessel-like beams that provides a superresolution image of the sample in the X and Z directions, and a second excitation objective can be oriented with its axis along the X direction and can illuminate the sample with an illumination pattern of Bessel-like beams that provides a superresolution image of the sample in the Y and Z directions. The super-resolution information that can be derived from illumination patterns from the different excitation objectives In another implementation, highly inclined, objective-coupled sheet illumination has been used to image single molecules in thicker regions of the cell where autofluorescence and out-of-focus excitation would be otherwise prohibitive under widefield illumination. With the thinner light sheets possible with Bessel beam plane illumination, only in-focus molecules would be excited, while out-of-focus ones would not be prematurely bleached. As such, it would be well suited to live cell 3D particle tracking and fixed cell photoactivated localization microscopy.

At the other extreme, the TPE sheet mode may be equally well suited to the imaging of large, multicellular specimens, since it combines the self-reconstructing property of Bessel beams with the improved depth penetration in scattering media characteristic of TPE. In addition to large scale 3D anatomical mapping with isotropic resolution, at high frame rates it might be fruitfully applied to the in vivo imaging of activity in populations of neurons.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the implementations.

What is claimed is:

1. A microscope comprising:
a light source for generating a light beam having a wavelength, $\lambda$;
beam-forming optics, including an optical element positioned in a path of the light beam and configured for generating an annular ring of light, the beam-forming optics being configured for generating from the light beam an excitation beam and also configured to direct the excitation beam to a position within a sample, wherein the excitation beam in the sample has a central lobe and at least one side lobe, wherein the beam-forming optics include an excitation objective having an axis oriented in a first direction, and wherein the excitation beam has a non-zero minimum numerical aperture and a maximum numerical aperture, and a ratio between the minimum numerical aperture and the maximum numerical aperture is less than 0.95;
imaging optics configured for receiving light from a position within the sample that is illuminated by the excitation beam and for imaging the received light on a detector, the imaging optics including a detection objective having an axis oriented in a second direction that is non-parallel to the first direction; and
a detector configured for detecting light received by the imaging optics.

2. The microscope of claim 1, wherein the optical element positioned in a path of the light beam and configured for generating an annular ring of light includes an annular apodization mask.

3. The microscope of claim 1, wherein the optical element positioned in a path of the light beam and configured for generating an annular ring of light includes a binary phase mask.

4. The microscope of claim 1, wherein the optical element positioned in a path of the light beam and configured for generating an annular ring of light includes a programmable spatial light modulator.

5. The microscope of claim 1, wherein the ratio between the minimum numerical aperture and the maximum numerical aperture is less than 0.90.

6. The microscope of claim 1, wherein an amount of energy in a highest-energy side lobe of the excitation beam is less than half of an amount of energy in the central lobe of the excitation beam.

7. The microscope of claim 1, wherein a ratio of a Rayleigh length, $z_R$, of the excitation beam in the sample to a minimum beam waist, $w_o$, of the excitation beam in the sample is more than $2\pi w_o/\lambda$ and less than $100\pi w_o/\lambda$.

8. The microscope of claim 1, further comprising a cover slip having a planar surface upon which the sample is mounted or cultured, the planar surface being tilted at an angle between 10 and 80 degrees with respect to the first direction.

9. The microscope of claim 8, wherein the sample is less than ten micrometers thick.

10. The microscope of claim 1, further comprising beam scanning optics configured for scanning the excitation beam in a direction having a component perpendicular to the first direction.

11. The microscope of claim 1, wherein the signal light is generated though a non-linear signal generation process.

12. The microscope of claim 1, wherein the signal light includes fluorescence light emitted from the sample after excitation by the excitation beam.

13. A method comprising:
providing a light beam having a wavelength, $\lambda$;
generating, from the light beam, an excitation beam having a central lobe and at least one side lobe;
providing the excitation beam to a position within a sample, wherein the excitation beam has a non-zero minimum numerical aperture and a maximum numerical aperture, and a ratio between the minimum numerical aperture and the maximum numerical aperture is less than 0.95;
imaging signal light receiving from a position within the sample that is illuminated by the excitation beam onto a detector.

14. The method of claim 13, wherein generating the excitation beam includes generating an annular ring of light with a binary phase mask.

15. The method of claim 13, wherein generating the excitation beam includes generating an annular ring of light with a programmable spatial light modulator.

16. The method of claim 13, wherein the ratio between the minimum numerical aperture and the maximum numerical aperture is less than 0.90.

17. The method of claim 13, wherein an amount of energy in a highest-energy side lobe of the excitation beam is less than half of an amount of energy in the central lobe of the excitation beam.

18. The method of claim 13, wherein a ratio of a Rayleigh length, $z_R$, of the excitation beam in the sample to a minimum beam waist, $w_o$, of the excitation beam in the sample is more than $2\pi w_o/\lambda$ and less than $100\pi w_o/\lambda$.

19. The method of claim 13, wherein the signal light is generated though a non-linear signal generation process.

20. The method of claim 13, wherein the signal light includes fluorescence light emitted from the sample after excitation by the excitation beam.

21. A microscope comprising:
a light source for generating a light beam having a wavelength, $\lambda$;
beam-forming optics, including an optical element positioned in a path of the light beam and configured for generating an annular ring of light, the beam-forming optics being configured for generating from the light beam an excitation beam and also configured to direct the excitation beam to a position within a sample, wherein the excitation beam in the sample has a central lobe and at least one side lobe, wherein the beam-forming optics include an excitation objective having an axis oriented in a first direction, and wherein a minimum beam waist, $w_o$, of the excitation beam in the sample is less than five micrometers and wherein a ratio of a Rayleigh length, $z_R$, of the excitation beam in the sample to the minimum beam waist, $w_o$, of the excitation beam in the sample is more than $2\pi w_o/\lambda$ and less than $100\pi w_o/\lambda$;
imaging optics configured for receiving light from a position within the sample that is illuminated by the excitation beam and for imaging the received light on a detector, the imaging optics including a detection objective having an axis oriented in a second direction that is non-parallel to the first direction; and
a detector configured for detecting light received by the imaging optics.

22. The microscope of claim 21, wherein the optical element positioned in a path of the light beam and configured for generating an annular ring of light includes an annular apodization mask.

23. The microscope of claim 21, wherein the optical element positioned in a path of the light beam and configured for generating an annular ring of light includes a binary phase mask.

24. The microscope of claim 21, wherein the optical element positioned in a path of the light beam and configured for generating an annular ring of light includes a programmable spatial light modulator.

25. The microscope of claim 21, wherein the excitation beam has a non-zero minimum numerical aperture and a maximum numerical aperture, and a ratio between the minimum numerical aperture and the maximum numerical aperture is less than 0.95.

26. The microscope of claim 21, wherein the excitation beam has a non-zero minimum numerical aperture and a maximum numerical aperture, and a ratio between the minimum numerical aperture and the maximum numerical aperture is less than 0.90.

27. The microscope of claim 21, wherein an amount of energy in a highest-energy side lobe of the excitation beam is less than half of an amount of energy in the central lobe of the excitation beam.

28. The microscope of claim 21, further comprising a cover slip having a planar surface upon which the sample is mounted or cultured, the planar surface being tilted at an angle between 10 and 80 degrees with respect to the first direction.

29. The microscope of claim 28, wherein the sample is less than ten micrometers thick.

30. The microscope of claim 21, further comprising beam scanning optics configured for scanning the excitation beam in a direction having a component perpendicular to the first direction.

31. The microscope of claim 21, wherein the signal light is generated though a non-linear signal generation process.

32. A method comprising:
providing a light beam having a wavelength, $\lambda$;
generating, from the light beam, an excitation beam having a central lobe and at least one side lobe;
providing the excitation beam to a position within a sample, wherein the excitation beam at the position in the sample has a central lobe and at least one side lobe, and wherein a minimum beam waist, $w_o$, of the excitation beam at the position in the sample is less than five micrometers and wherein a ratio of a Rayleigh length, $z_R$, of the excitation beam in the sample to the minimum beam waist, $w_o$, of the excitation beam in the sample is more than $2\pi w_o/\lambda$ and less than $100\pi w_o/\lambda$; and imaging signal light receiving from a position within the sample that is illuminated by the excitation beam onto a detector.

33. The method of claim 32, wherein generating the excitation beam includes generating an annular ring of light with a binary phase mask.

34. The method of claim 32, wherein generating the excitation beam includes generating an annular ring of light with a programmable spatial light modulator.

35. The method of claim 32, wherein the excitation beam has a non-zero minimum numerical aperture and a maximum numerical aperture, and a ratio between the minimum numerical aperture and the maximum numerical aperture is less than 0.95.

36. The method of claim 32, wherein the excitation beam has a non-zero minimum numerical aperture and a maximum numerical aperture, and a ratio between the minimum numerical aperture and the maximum numerical aperture is less than 0.90.

37. The method of claim 32, wherein an amount of energy in a highest-energy side lobe of the excitation beam is less than half of an amount of energy in the central lobe of the excitation beam.

38. The method of claim 32, wherein the signal light is generated though a non-linear signal generation process.

* * * * *

UNITED STATES PATENT AND TRADEMARK OFFICE
CERTIFICATE OF CORRECTION

PATENT NO. : 9,891,421 B2
APPLICATION NO. : 14/215976
DATED : February 13, 2018
INVENTOR(S) : Betzig It is certified that error appears in the above-identified patent and that said Letters Patent is hereby corrected as shown below:

In the Claims

In Column 23, Line 21, Claim 11, delete "though" and insert -- through --, therefor.

In Column 23, Line 34, Claim 13, delete "0.95;" and insert -- 0.95; and --, therefor.

In Column 23, Line 56, Claim 19, delete "though" and insert -- through --, therefor.

In Column 24, Line 58, Claim 31, delete "though" and insert -- through --, therefor.

In Column 25, Line 30, Claim 38, delete "though" and insert -- through --, therefor.

Signed and Sealed this
Twelfth Day of February, 2019

Andrei Iancu
*Director of the United States Patent and Trademark Office*